United States Patent
Madonna et al.

(10) Patent No.: US 8,296,669 B2
(45) Date of Patent: Oct. 23, 2012

(54) VIRTUAL ROOM-BASED LIGHT FIXTURE AND DEVICE CONTROL

(75) Inventors: Robert P. Madonna, Osterville, MA (US); Nicholas J. Cipollo, Osterville, MA (US)

(73) Assignee: Savant Systems, LLC, Hyannis, MA (US)

( * ) Notice: Subject to any disclaimer, the term of this patent is extended or adjusted under 35 U.S.C. 154(b) by 323 days.

(21) Appl. No.: 12/792,236

(22) Filed: Jun. 2, 2010

(65) Prior Publication Data

US 2010/0312366 A1    Dec. 9, 2010

Related U.S. Application Data

(60) Provisional application No. 61/183,825, filed on Jun. 3, 2009.

(51) Int. Cl.
  *G06F 3/00*   (2006.01)
  *G06F 3/048*  (2006.01)
  *G06F 9/44*   (2006.01)
  *G05B 11/01*  (2006.01)
  *G05B 19/42*  (2006.01)

(52) U.S. Cl. ........ 715/765; 715/763; 715/764; 715/771; 717/108; 717/116; 717/120; 717/121; 700/17; 700/19; 700/66; 700/83

(58) Field of Classification Search .............. 700/17–20, 700/65–66, 83, 86–87; 340/3.71; 715/763–765, 715/771; 718/108, 116, 120–121
See application file for complete search history.

(56) References Cited

U.S. PATENT DOCUMENTS

| | | |
|---|---|---|
| 6,160,359 A | 12/2000 | Fleischmann |
| 6,756,998 B1 | 6/2004 | Bilger |
| 7,047,092 B2 * | 5/2006 | Wimsatt .......................... 700/83 |
| 7,167,777 B2 | 1/2007 | Budike, Jr. |
| 7,529,838 B2 * | 5/2009 | Primm et al. ................. 709/226 |
| 7,760,107 B1 * | 7/2010 | Stepps et al. ............. 340/815.45 |

(Continued)

FOREIGN PATENT DOCUMENTS

DE    100 12 508 A1    9/2001

(Continued)

OTHER PUBLICATIONS

"HomeRunner: User Manual," JDS Technologies, Feb. 2007, pp. 1-12.

(Continued)

*Primary Examiner* — Ramesh Patel
(74) *Attorney, Agent, or Firm* — Cesari and McKenna, LLP

(57) ABSTRACT

In one embodiment, a technique for controlling one or more devices within a physical room of a structure is provided. One or more devices in the structure are coupled, either directly or indirectly, to a programmable multimedia controller configured to issue control commands which, when implemented, change the state of the devices. A virtual room-based user interface is displayed on a display screen. The virtual room-based user interface may include one or more virtual rooms, each virtual room including a substantially photo-realistic depiction of a portion of the structure, including substantially photo-realistic depictions of one or more devices located within the portion of the structure. In response to the selection of a particular substantially photo-realistic visual depiction, the programmable multimedia controller may issue control commands which, when implemented, change the state of a particular device. The appearance of the particular virtual room may be updated to reflect the changed state.

20 Claims, 16 Drawing Sheets

U.S. PATENT DOCUMENTS

| | | | |
|---|---|---|---|
| RE42,289 E * | 4/2011 | Vincent | 348/333.02 |
| 8,042,049 B2 * | 10/2011 | Killian et al. | 715/740 |
| 8,122,131 B2 * | 2/2012 | Baum et al. | 709/226 |
| 2008/0127063 A1 * | 5/2008 | Silva et al. | 717/107 |
| 2008/0270937 A1 * | 10/2008 | Poulet et al. | 715/810 |
| 2009/0083634 A1 * | 3/2009 | Madonna et al. | 715/733 |
| 2009/0303197 A1 * | 12/2009 | Bonczek et al. | 345/173 |
| 2010/0185969 A1 | 7/2010 | Wendt et al. | |
| 2010/0277107 A1 | 11/2010 | Baaijens et al. | |
| 2011/0273114 A1 | 11/2011 | Ogg et al. | |
| 2012/0084472 A1 * | 4/2012 | Locascio et al. | 710/104 |

FOREIGN PATENT DOCUMENTS

| | | |
|---|---|---|
| DE | 103 14 134 A1 | 10/2003 |
| EP | 1 986 474 A2 | 10/2008 |
| WO | WO-02/099780 A2 | 12/2002 |
| WO | WO-2009/004531 A1 | 1/2009 |

OTHER PUBLICATIONS

"Pocket WebX: Installation and Operation Manual," JDS Technologies, Feb. 2004, pp. 1-12.

"Notification of Transmittal of the International Search Report and the Written Opinion of the International Searching Authority, or the Declaration," International Filing Date: Jun. 2, 2010, International Application No. PCT/US2010/001600, Applicant: Nsavan Systems, LLC., Date of Mailing: Sep. 3, 2010, pp. 1-14.

* cited by examiner

VIRTUAL ROOM-BASED LIGHT FIXTURE AND DEVICE CONTROL

RELATED APPLICATIONS

This Application claims priority to U.S. Provisional Patent Application Ser. No. 61/183,825, filed on Jun. 3, 2009 by Robert P. Madonna, and entitled "Virtual Room-Based Light Fixture and Device Control", which is incorporated by reference herein in its entirety.

BACKGROUND

1. Technical Field

The present disclosure relates generally to light fixture and device control and more specifically to virtual room-based light fixture and device control techniques.

2. Background Information

As homes and other structures become larger, and filled with more electrical and electronic devices, the burden of controlling these electrical and electronic devices has also increased. One particular area in which this issue has manifest is in the area of lighting control.

Traditionally light fixtures in a home or other structure have been largely controlled by wall mounted mechanical light switches, including mechanical toggle switches, rocker switches, push button switches, and the like. Such mechanical switches have taken the form of 2-way switches, where a light fixture is controlled from a single switch location, 3-way switches, where a light fixture is controlled from two switch locations, 4-way switches where a light fixture is controlled from three switch locations, etc. In some cases, mechanical switches have been augmented by mechanical dimmers, which allow a light fixture to be dimmed or brightened, for example, by turning a knob that adjusts a variable resister in series with the light fixture.

While mechanical switches and dimmers have proved reliable and cost-effective, they have increasingly shown their limitations in large homes and other structures. A single room in a large home or other structure may include a large number of individual light fixtures. For example, a large room may include several free-standing light fixtures, such as lamps, that provide task lighting; several fixed light fixtures, such as recessed cans and/or wall sconces, that provide general lighting; as well as several special-purpose light fixtures, such as accent spots, that provide illumination on artwork, architectural features or other elements of the room. To control all the light fixtures in a large room using traditional mechanical light switches and dimmers, a variety of "ganged" switch panels have traditionally been employed. FIG. 1 is a depiction of a conventional 6-gang mechanical switch panel 100, housing six individual mechanical switches 110, 120, 130, 140, 150, 160, each of which may control one or more light fixtures. A large room with many light fixtures may require several of these panels, located at several locations in the room, for example, near different entrances, to provide adequate means for control of all the light fixtures in the room.

As should be apparent, while this type of control scheme is functional in a large room, it is typically not user friendly. A user must memorize which of the many mechanical switches controls which individual light fixture or fixtures. A new guest in the room, who has not memorize this relationship, typically must attempt by trial and error to determine which mechanical switch controls which fixture or fixtures, flipping each switch until they happen upon the result they desire. This may quickly lead to frustration.

More recently, a variety of types of electronic lighting control systems have been developed which attempt to improved upon the traditional lighting control experience. Such electronic lighting control systems typically include one or more programmable electronic lighting controllers, which are interconnected via control wiring to relays and/or dimmer units wired inline with each individual light fixture. The electronic lighting controllers may also be connected to a number of wall mounted, table-top, or portable control panels, either by wired, or wireless, links. Some electronic lighting control systems support a variety of lighting "scenes", such that a number of lights may be activated, deactivated, and/or dimmed together, in response to a single control section, for example, a single button press. For instance, a particular lighting scene in a room may activate certain task lighting and fixed lighting at high-brightness, appropriate for reading, while another lighting scene in the room may activate only certain accent lighting, at a very low level, creating a setting suitable for movie viewing.

However, many conventional electronic lighting control systems still employ button-centric user interfaces reminiscent of the mechanical switches and dimmers they replace. FIG. 2 depicts a conventional wall-mounted control panel 200 for a conventional electronic lighting control system. The panel 200 includes a plurality of physical push buttons labeled with text labels. Lighting scene selection buttons 205, 210, 215, 220 enable selection of various lighting scenes, while dimmer controls 230 are provided to adjust brightness. Further, the control panel 200 includes buttons 240 for selecting light fixtures in other rooms of the home or structure, as well as "All On" and "All Off" buttons 250, 255 for global control.

While conventional electronic lighting control systems that employ conventional button-centric control panels 200 may offer some improvement over traditional ganged mechanical switches and dimmers, the lighting control experience may still be quite user-unfriendly. While the overall number of controls may be reduced, one still must determine which push-button operates which light fixture, or group of light fixtures, in a large room. Typically, only a short cryptic name is provided on the face of each push-button as a guide. Further, should a user desire to deviate from the provided scenes, and activate, deactivate and/or dim particular light fixtures, the user may have to navigate a confusing array of override and manual controls. Thus, the overall user experience can still be rather frustrating.

In addition to conventional button-centric control panels that employ physical push-buttons, some conventional electronic lighting control systems work in conjunction with touch-screen control units that display menu-based user interfaces. Rather than manipulate physical push-buttons, a user may select, via touch, representations of buttons on a touch screen. FIG. 3 depicts a conventional touch-based user interface 310 for a conventional electronic lighting control system on touch-screen control unit 300. Similar to the button-centric control panel 200 discussed above, the user interface 310 displays a plurality of buttons 320, 330, 340, 350 for selecting various lighting scenes. Further, the user interface 310 includes dimmer controls 360 for adjusting brightness, as well as menuing controls 370 for accessing interfaces for other rooms in the home or structure. As is apparent, while the user is no longer actuating physical push-buttons, the overall user experience provided by a conventional touch-screen control unit 300 is often little change from that provided by a conventional button-centric control panel 200. Rather utilizing physical buttons, the user is simply utilizing digital buttons. The user still must memorize which buttons operate which light fixtures, or groups of light fixtures, and may still have to resort to trial and error to determine exactly what each button does. Thus, the overall user experience may be just as frustrating as with a conventional button-centric control panel 200.

Further, the above-discussed limitations of conventional control systems are not limited to the field of lighting control. A variety of other types of electrical and electronic devices are typically present in homes and other structures, and typically suffer from similar control shortcomings. For example, a large room in a home or other structure may include a number of motor operated devices, such as automatic window shades or ceiling fans, which a user may desire to operate and adjust selectively. Similarly, a large room in a home or other structure may include a number of audio/video (A/V) components that a user may desire to select and control, as well as other devices that a user may desire to operate in a controlled manner. Further, a room of a home or other structure may include various heating, ventilating, and air conditioning and/or energy management devices user may desire to manage. As with light fixtures, a user may be forced to memorize which mechanical switch, physical push-button, or digital button is associated with each device and/or each function of a device, and may become frustrated when simply turning on or off a device, or otherwise changing the state of a device, becomes a complicated endeavor.

Accordingly, there is a need for improved techniques for controlling light fixtures and other devices in a home or other structure.

SUMMARY

The shortcomings of the prior art are addressed in part by a programmable multimedia controller that supports a novel virtual room-based user interface. In one embodiment, the virtual room-based user interface includes a plurality of virtual room interface environments (hereinafter "virtual rooms"). Each virtual room corresponds to a different physical room (or portion of a physical room) in a home or other structure. In some cases, several virtual rooms may correspond to different portions of one physical room, e.g., to cover the entire physical room. Each virtual room may include a substantially photo-realistic depiction of the boundaries of the physical room (or portion of the physical room), for example, of the walls, ceiling, floor, etc. that define the room; may show at least a portion of furnishings present in the physical room (or portion of the physical room), for example, sofas, chairs, beds, wall-hangings, etc. that are present in the physical room; and may show devices, for example, light fixtures, under control (either directly or indirectly) of the programmable multimedia controller that are present within the physical room (or portion of the physical room).

Substantially photo-realistic depictions of devices under control are preferably shown at locations within the virtual room corresponding to the device's actual locations within the physical room. In the preferred embodiment, the substantially photo-realistic depictions of the room and the devices are derived from a limited number of prerecorded images, for example, a limited number of still digital photographs of the physical room, captured from a predetermined location and showing the room in differing states. However, a variety of other techniques for creation of the substantially photo-realistic depictions of the room and the devices are expressly contemplated and described below.

Using the virtual room-based user interface, a user may select, control, and otherwise interact with the devices, for example, the light fixtures, in the physical room by manipulating the substantially photo-realistic visual depictions of the devices within the virtual room, for example, by selecting the visual depictions of the devices within the virtual room on a touch-screen display. The appearance of the virtual room may be dynamically updated in response to the user's manipulations in the virtual room. Further, the appearance of the virtual room may be dynamically updated in response to data received from devices within the physical room and/or in response to environmental changes. In such manner, a virtual room may be continuously updated to show a substantially photo-realistic depiction of at least a portion of the corresponding physical room, such that what a user views within the virtual room will mirror, or at least resemble, their experience within the corresponding physical room at a given time.

BRIEF DESCRIPTION OF THE DRAWINGS

The description below refers to the accompanying drawings of example embodiments, of which.

DETAILED DESCRIPTION

Figure 1:
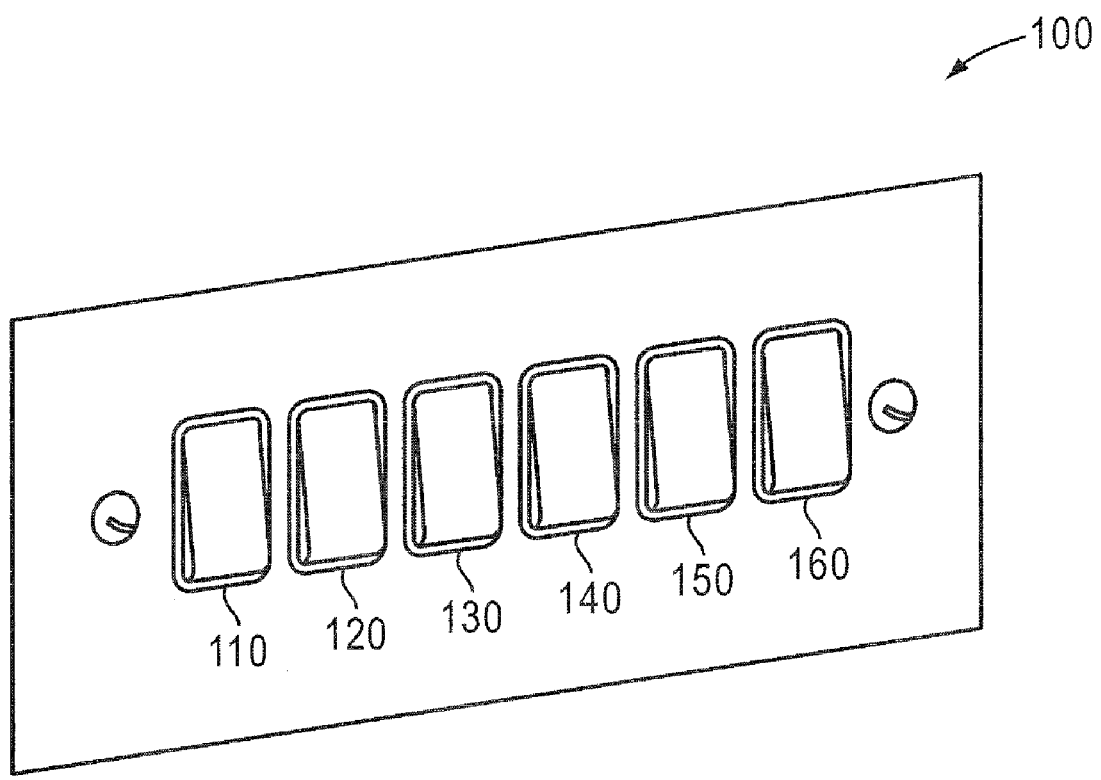
FIG. 1 is a depiction of a conventional 6-gang mechanical switch panel, housing six individual mechanical switches.
Figure 2:
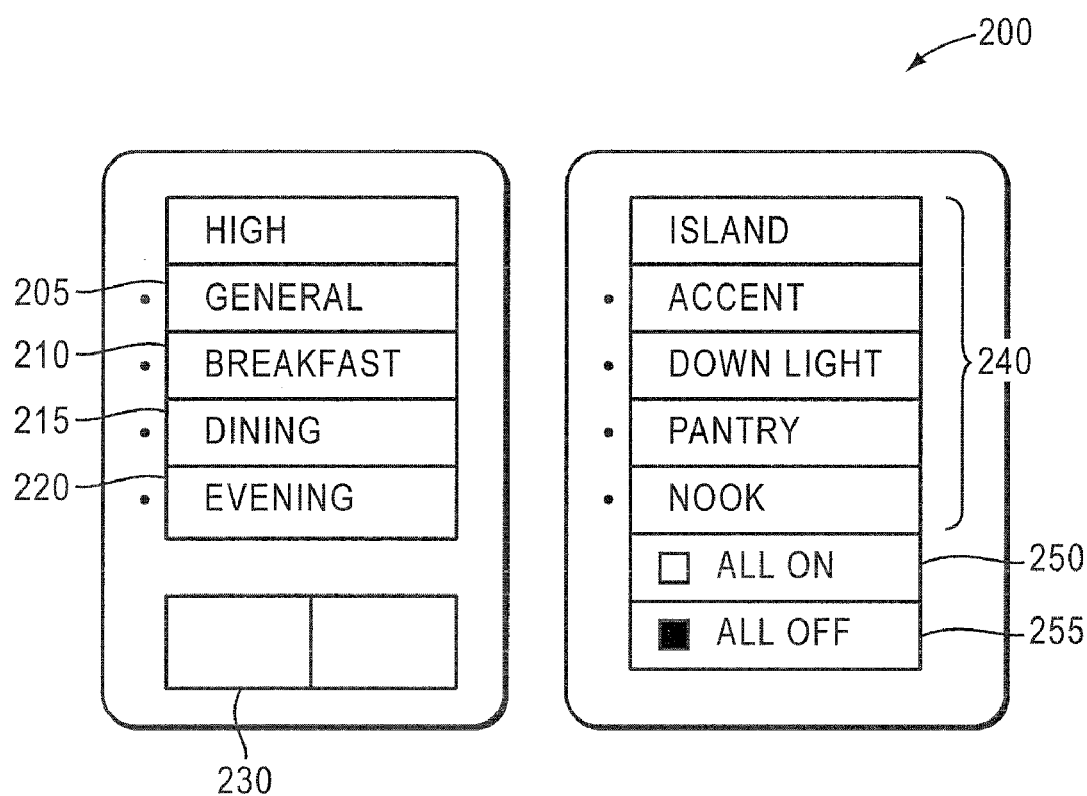
FIG. 2 is a depiction of a conventional wall-mounted control panel for a conventional electronic lighting control system.
Figure 3:
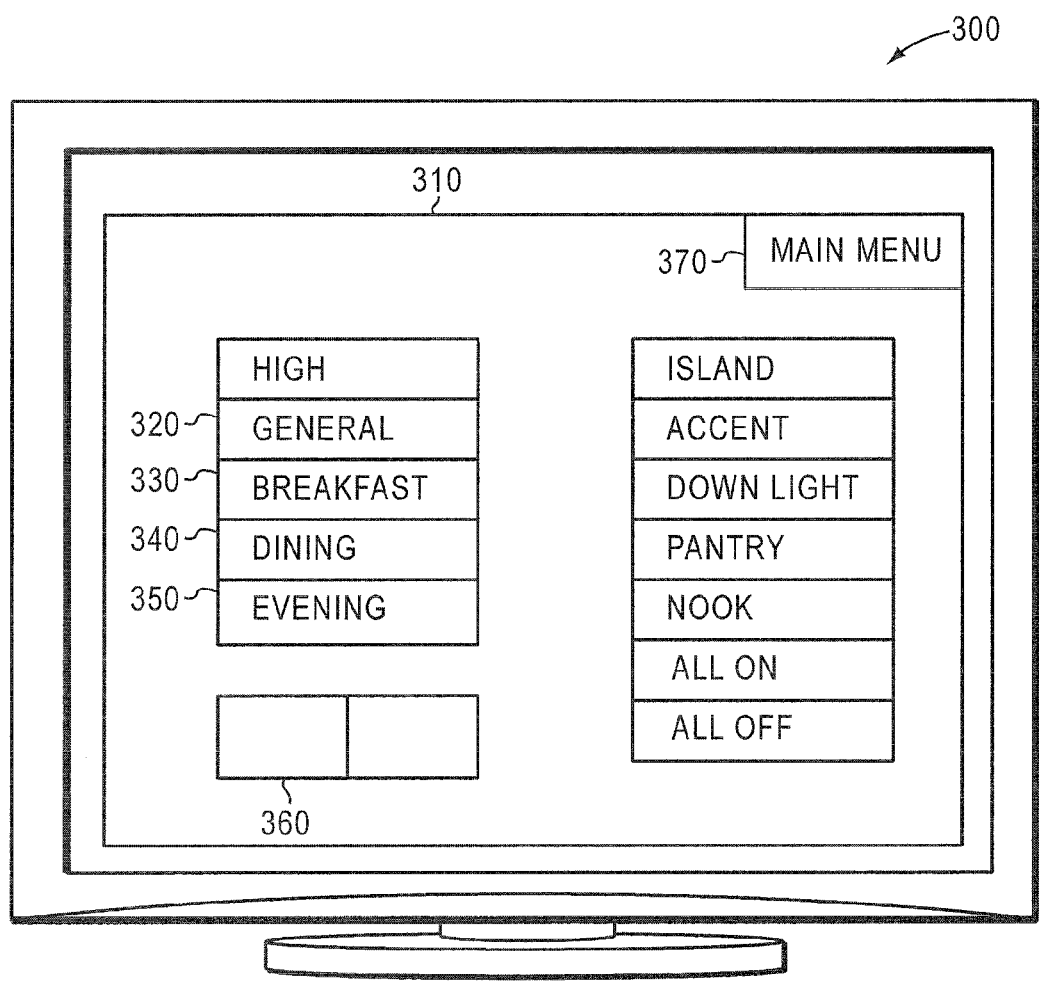
FIG. 3 is a depiction of a conventional touch user interface for a conventional electronic lighting control system.
Figure 4:
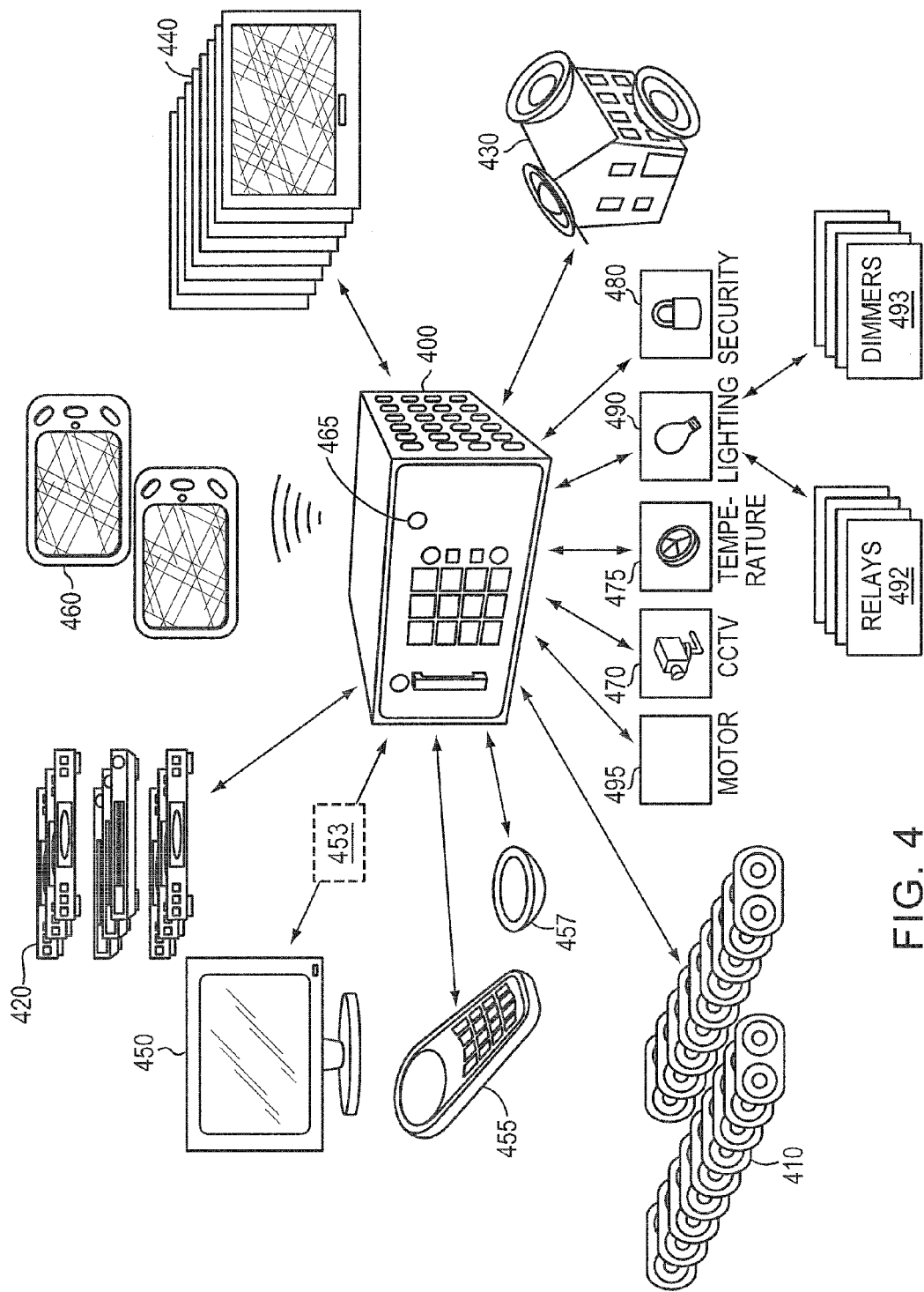
FIG. 4 is a block diagram of an example programmable multimedia controller interconnected to a number of devices.

FIG. 4 is a block diagram of an example programmable multimedia controller 400 interconnected to a number of devices. The term "programmable multimedia controller" should be interpreted broadly as a device capable of controlling, switching data between, and/or otherwise interoperating with a variety of electrical and electronic devices, such as audio, video, telephony, data, security, motor-operated, relay-operated, heating, ventilation, and air conditioning (HVAC), energy management and/or other types of devices.

The programmable multimedia controller 400 may be coupled to a variety of A/V devices, including audio source devices 410, such as compact disk (CD) players, digital video disc (DVD) players, microphones, digital video recorders (DVRs), cable boxes, audio/video receivers, personal media players, and other devices that source audio signals; may be coupled to a variety of video source devices 420, such as digital video disc (DVD) players, digital video recorders (DVRs), cable boxes, audio/video receivers, personal media players and other devices that source video signals; may be coupled to a variety of audio output devices 430, such as speakers, devices that incorporate speakers, and other devices that output audio; and may be coupled to a variety of video output devices 440, such as televisions, monitors, and other devices that output video.

Further, the programmable multimedia controller 400 may be coupled to, control, and otherwise interoperate with a variety of other types of devices, either directly, or through one or more intermediate controllers. For example, the programmable multimedia controller 400 may be coupled to a closed-circuit television (CCTV) control system 470 that manages a system of cameras positioned about a home or other structure, HVAC control and/or energy management system 475 that manages HVAC devices to regulate environmental functions and/or energy management devices in the home or other structure, and/or a security system 480 that manages a plurality of individual security sensors in the home or other structure. In response to control commands received from the programmable multimedia controller 400, the CCTV control system 470, the HVAC control system and/or energy management system 475, and the security system 480 may manage the devices under their respective immediate control.

Further, the programmable multimedia controller 400 may be coupled to, control, and otherwise interoperate with, one or more electronic lighting controllers 490. The one or more electronic lighting controllers 490 may be coupled to, for example, via wired or wireless links, a plurality of relays 492 and/or dimmer units 493 distributed throughout the home or other structure, and wired inline with the electrical feed to individual light fixtures located therein. In response to control commands received from the programmable multimedia controller 400, the one or more electronic lighting controllers 490 may selectively trigger relays 492 and/or adjust dimmer units 493 wired inline to particular light fixtures (not shown), to create a desired level of illumination or darkness in different rooms of the home or other structure.

Similarly, the programmable multimedia controller 400 may be coupled to, control, and otherwise interoperate with, one or more motor operated device controllers 495, for example, one or more automatic window shade controllers, or other types of controllers. As with lighting control, in response to control commands received from the programmable multimedia controller 400, the motor-operated device controllers 495 may selectively trigger motor-operated devices (not shown) in various rooms of the home or other structure, to achieve desired effects.

The programmable multimedia controller 400 may receive user-input via one or more control units 450, for example, wall-mounted control units, table-top control units, hand-held portable control units, and the like, that include a display screen. The one or more control units 450 may include a touch screen interface, a mouse and pointer interface, or other type of interface. The control units 450 may be special-purpose units, dedicated to operating with the programmable multimedia controller 400, or general-purpose devices, for example, laptop computers, desktop computers, etc., configured with software to implement a user interface according to the below described techniques. In some cases, the control units 450 may be coupled to the programmable multimedia controller 400 via an intermediate device 453, such as a computer, via a wired or wireless connections or networks. In other cases, the control units 450 may communicate directly to the able multimedia controller 400.

The programmable multimedia controller 400 may also receive user-input via one or more handheld button-centric remote control units and/or wall mounted button-centric control units 455, or from one or more handheld remote control units including an annular touch sensor 457. Remote control units including an annular touch sensor 457 may be adapted to manipulate, and make control selections using, an on-screen menuing system, displayed on a display device. Further details regarding remote control units including an annular touch sensor may be found in Madonna et al., U.S. patent application Ser. No. 11/520,328, filed Sep. 13, 2006 and titled "Remote Control Unit for a Programmable Multimedia Controller," the contents of which are incorporated by reference herein in their entirety.

The programmable multimedia controller 400 may also receive user-input via one or more mobile devices 460. As used herein, the term "mobile device" refers to electronic devices that are adapted to be transported on one's person, including multimedia smartphones, such as the iPhone® multimedia phone available from Apple Inc. and the Blackberry® device available from Research In Motion Limited, multi-purposes tablet computing devices, such as the iPad® tablet available from Apple Inc., portable media players with enhanced capabilities, such as the iPod® touch available from Apple Inc., personal digital assistants (PDAs), electronic book readers, and the like. Such mobile devices may communicate directly with the programmable multimedia controller 400, or indirectly through various wireless, cellular, and/or wired networks (not shown).

Further, the programmable multimedia controller 400 may receive user-input via a touch screen or other interface integrated into the programmable controller multimedia 400 itself, for example, a touch screen or other interface presented on a front panel 465 of the programmable multimedia controller 400.

Still further, the programmable multimedia controller 400 may receive user-input via a touch screen integrated into a video output device 440, such as a television.

In response to user-input from one of the control units 450, button-centric remote control units and/or wall mounted button-centric control units 455, remote control units including an annular touch sensor 457, mobile devices 460, the front panel 465 and/or video output devices 440, the programmable multimedia controller 400 may switch data between, issue control commands to, and/or otherwise interoperate with, the audio source devices 410, the video source devices 420, the audio output devices 430, and/or the video output devices 440. Further, in response to the user-input, the programmable multimedia controller 400 may issue control commands to, and otherwise interoperate with, the CCTV control system 470, the HVAC control and/or energy management system 475, the security system 480, the electronic lighting controllers 490, as well as the motor operated device controllers 495. The user-input which directs such functionality, at least in part, may be received within a novel virtual room-based user interface, as explained further below.

In the preferred embodiment, the novel virtual room-based user interface is displayed on the screen of a control unit 450, mobile device 460, front panel display 465 or other device that has a touch screen, and the user makes selections therein by touching selected portions of the interface with their finger, a stylus, or similar implement. In other embodiments, the virtual room-based user interface is displayed on a display screen, that lacks touch recognition capabilities, and a user may interact with the interface using some other type of interface, for example, a mouse. In one configuration, the user may make selections using handheld button-centric remote control units and/or wall mounted button-centric control units 455, remote control units including an annular touch sensor 457, or other device. In response to user-selections in the virtual room-based user interface, the programmable multimedia controller 400 may issue specific control commands to the devices coupled to it.

Figure 5:
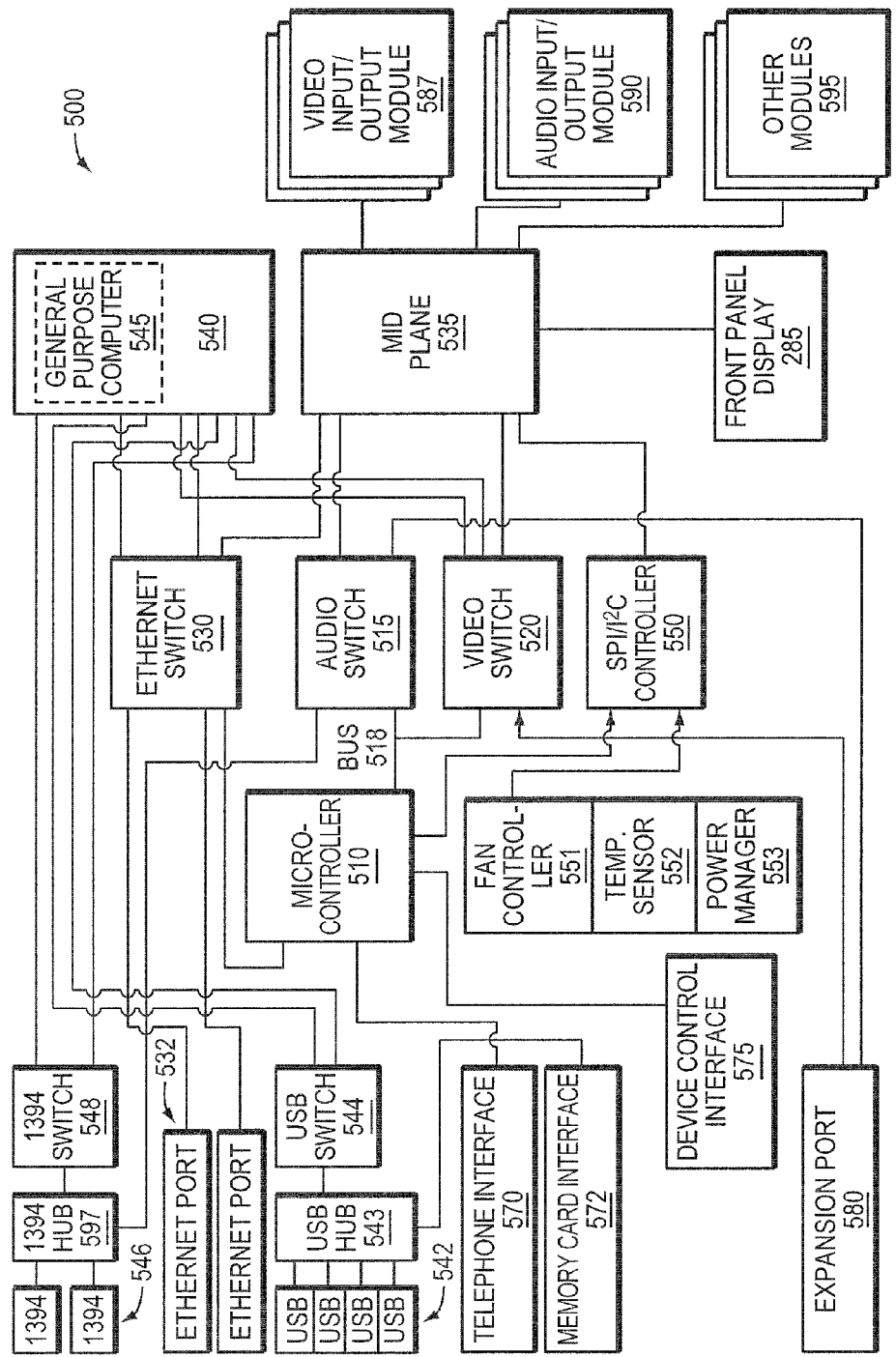
FIG. 5 is a block diagram of an example hardware architecture of the example programmable multimedia controller of FIG. 4.

FIG. 5 is a schematic block diagram of an example hardware architecture 500 of the example programmable multimedia controller 400. The various components shown may be arranged on a "motherboard" of the controller 400, or on a plurality of circuit cards interconnected by a backplane (not shown). A microcontroller 510 manages the general operation of the controller 400. The microcontroller 510 is coupled to an audio switch 515 and a video switch 520 via a bus 518. The audio switch 515 and the video switch 520 are preferably crosspoint switches capable of switching a number of connections simultaneously. However, many other types of switches capable of switching digital signals may be employed, for example Time Division Multiplexing (TDM) switches or other devices. Further, while two separate switches 515, 520 are shown, audio and video switching may be consolidated into a single switch that supports switching of both types of data.

A mid plane 535 interconnects the audio and video switches 515, 520 to a variety of input and output modules, for example, one or more Video Input/Output Modules 587, one or more Audio Input/Output Modules 590, and/or one or more other modules 595. Such modules may include a plural of connection ports that may be coupled to A/V devices. Further details regarding the operation of the one or more Video Input/Output Modules 587, one or more Audio Input/ Output Modules 590, and/or one or more other modules 595 may be found in Madonna et al., U.S. patent application Ser. No. 11/314,664, filed Dec. 20, 2005 and titled "System and Method for a Programmable Multimedia Controller", the contents of which are incorporated by reference herein in their entirety.

The mid plane 535 is further coupled to an Ethernet switch 530 that interconnects Ethernet ports 532 and a processing subsystem 540 to the microcontroller 210. In one embodiment, the processing subsystem 540 includes one or more "general-purpose computers" 545. A general-purpose computer 545, as used herein, refers to a device that is configured to execute a set of instructions, and depending upon the particular instructions executed, may perform a variety of different functions or tasks. Typically, but not always, a general-purpose computer 545 executes a general-purpose operating system, such as the Windows® operating system, available from Microsoft Corporation, the Linux® operating system, available from a variety of vendors, the OSX® operating system, available from Apple Inc., or another operating system. The general-purpose computer 545 may include a computer-readable medium, for example, a hard drive, a Compact Disc read-only memory (CDROM) drive, a Flash memory, or other type of storage device, and/or may be interconnected to a storage device provided elsewhere in the processing subsystem 540.

The processing subsystem 540 preferably has one or more graphics outputs 541, 542 such as analog Video Graphics Array (VGA) connectors, Digital Visual Interface (DVI) connectors, Apple Display Connector (ADC) connectors, or other type of connectors, for supplying graphics. Such graphics outputs 541, 542 may, for example, be supplied directly from the one or more general-purpose computers 545 of the processing subsystem 240.

The example programmable multimedia controller 400 may also include a memory card interface and a number of Universal Serial Bus (USB) ports 542 interconnected to a USB hub 543. Such USB ports 542 may be couple to external devices. A USB switch 544 is employed to switch USB signals received at the hub to the processing subsystem 540. In a similar manner, a number of IEEE 1394 (FireWire™) ports 546 may be coupled to external devices and pass data to an IEEE 1394 hub 547 and to an IEEE 1394 switch 548, for switching to the processing subsystem 540.

The microcontroller 510 is further connected to a Serial Peripheral Interface (SPI) and Inter-Integrated Circuit (I²C) distribution circuit 550, which provides a serial communication interface to relatively low data transfer rate devices. The SPI/I²C controller 550 is connected to the mid plane 535 and thereby provides control commands from the microcontroller 510 to the modules 587, 590, 595 of the programmable multimedia controller 300. Further, connections from the SPI/I²C controller 550 are provided to components such as a fan controller 551, a temperature sensor 552, and a power manager circuit 553, which collectively manage the thermal characteristics of the programmable multimedia controller 400.

The microcontroller 510 is also connected to a device control interface 575 that may communicate with the CCTV control system 470, the HVAC control and/or energy management system 475, the security system 480, the one or more electronic lighting controllers 490 as well as the one or more motor operated device controllers 495. Further, a telephone interface 570 may be provided to connect to a telephone network and/or telephone handsets. In addition, an expansion port 580 may be provided for linking several programmable multimedia controllers 100 together, to form an expanded system, while a front panel display 465, for example, a touch screen display, is provided to display status, configuration, and/or other information to a user, as well as to accept user input.

Such a programmable multimedia control 400 or other platform may support a novel virtual room-based user interface. In one embodiment, the virtual room-based user interface includes a plurality of virtual room interface environments (hereinafter "virtual rooms"). Each virtual room corresponds to a different physical room (or portion of a physical room) in a home or other structure). In some cases, several virtual rooms may correspond to different portions of one physical room, e.g., to cover the entire physical room. Each virtual room may include a substantially photo-realistic depiction of the boundaries of the physical room (or portion of the physical room), for example, of the walls, ceiling, floor, etc. that define the room; may show at least a portion of furnishings present in the physical room (or portion of the physical room), for example, sofas, chairs, beds, wall-hangings, etc. that are present in the physical room; and may show devices, for example, light fixtures, under control (either directly or indirectly) of the programmable multimedia controller that are present within the physical room (or portion of the physical room).

Substantially photo-realistic depictions of devices under control are preferably shown at locations within the virtual room corresponding to the device's actual locations within the physical room. In the preferred embodiment, the substantially photo-realistic depictions of the room and the devices are derived from a limited number of prerecorded images, for example, a limited number of still digital photographs of the physical room, captured from a predetermined location and showing the room in differing states. However, a variety of other techniques for creation of the substantially photo-realistic depictions of the room and the devices are expressly contemplated and described below.

Using the virtual room-based user interface, a user may select, control, and otherwise interact with the devices, for example, light fixtures, by manipulating the substantially photo-realistic visual depictions of the devices within the virtual room, for example, by selecting the visual depictions of the devices within the virtual room. The appearance of the virtual room may be dynamically updated in response to the user's manipulations in the virtual room. The appearance of the virtual room may also be dynamically updated in response to data received from devices within the physical room and/or environmental changes, for example, time of day. In such manner, the virtual room may be continuously updated to show a substantially photo-realistic depiction of at least a portion of the corresponding physical room, such that what a user views within a virtual room will mirror, or at least resemble, their experience within the corresponding physical room at a given time.

Figure 6:
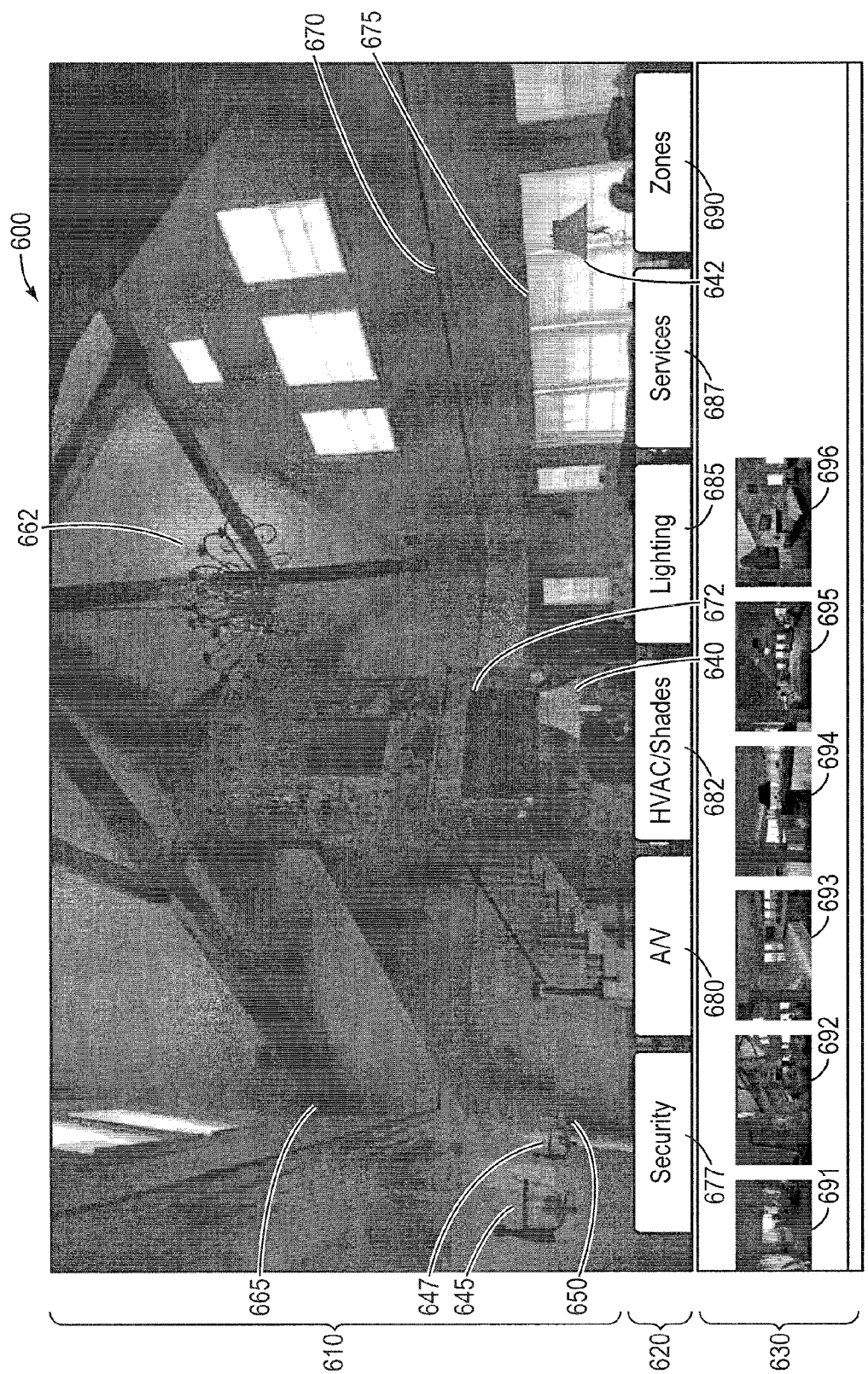
FIG. 6 is a diagram of an example virtual room-based user interface.

FIG. 6 is a diagram of an example virtual room-based user interface 600. The example virtual room-based user interface 600 may include a main portion 610 that provides a virtual room for controlling devices within a corresponding physical room. The example virtual room-based user interface 600 may further include a menu portion 620, configured to display selectable menu tabs corresponding to different types of functionality, and a function specific portion 630, configured to display options specific to a selected menu tab.

In the example virtual room-based user interface 600, a virtual room corresponding to a portion of a "great room" is shown. A substantially photo-realistic depiction of a portion of the "great room" is displayed, including the boundaries of the physical room, its furnishings, and devices under control of the programmable multimedia controller 400 that are within the portion of the room. For example, the example virtual room shows substantially photo-realistic representations of free-standing light fixtures, such as lamps 640, 642; fixed light fixtures, such as wall sconces 645, 647, 650 and chandelier 662; and special-purpose light fixtures, such as accent lighting 665, 667, and 670. Further, the example virtual room shows substantially photo-realistic visual depictions of a flat-screen television 672 and automatic window shades 675, which are also under control of the programmable multimedia controller 400. A user may manipulate the substantially photo-realistic visual depictions of the devices within the virtual room, to select, control, or otherwise interoperate with the devices within the physical room.

For example, a user may select particular light fixtures to activate by selecting, e.g., touching or clicking on, the substantially photo-realistic visual depictions of the light fixtures within the virtual room. For instance, a user may select, e.g., touch or click on, the substantially photo-realistic visual depiction of a lamp 640 and a chandelier 662. In response thereto, the programmable multimedia controller 400 may send control commands to one or more electronic lighting controllers 490 to cause such controllers to activate relays wired inline with the electrical feed to the lamp 640 and the chandelier 662. Further, the programmable multimedia controller 400 may update the virtual room, such that it shows a substantially photo-realistic depiction of the physical room with the particular light fixtures illuminated.

Figure 7:
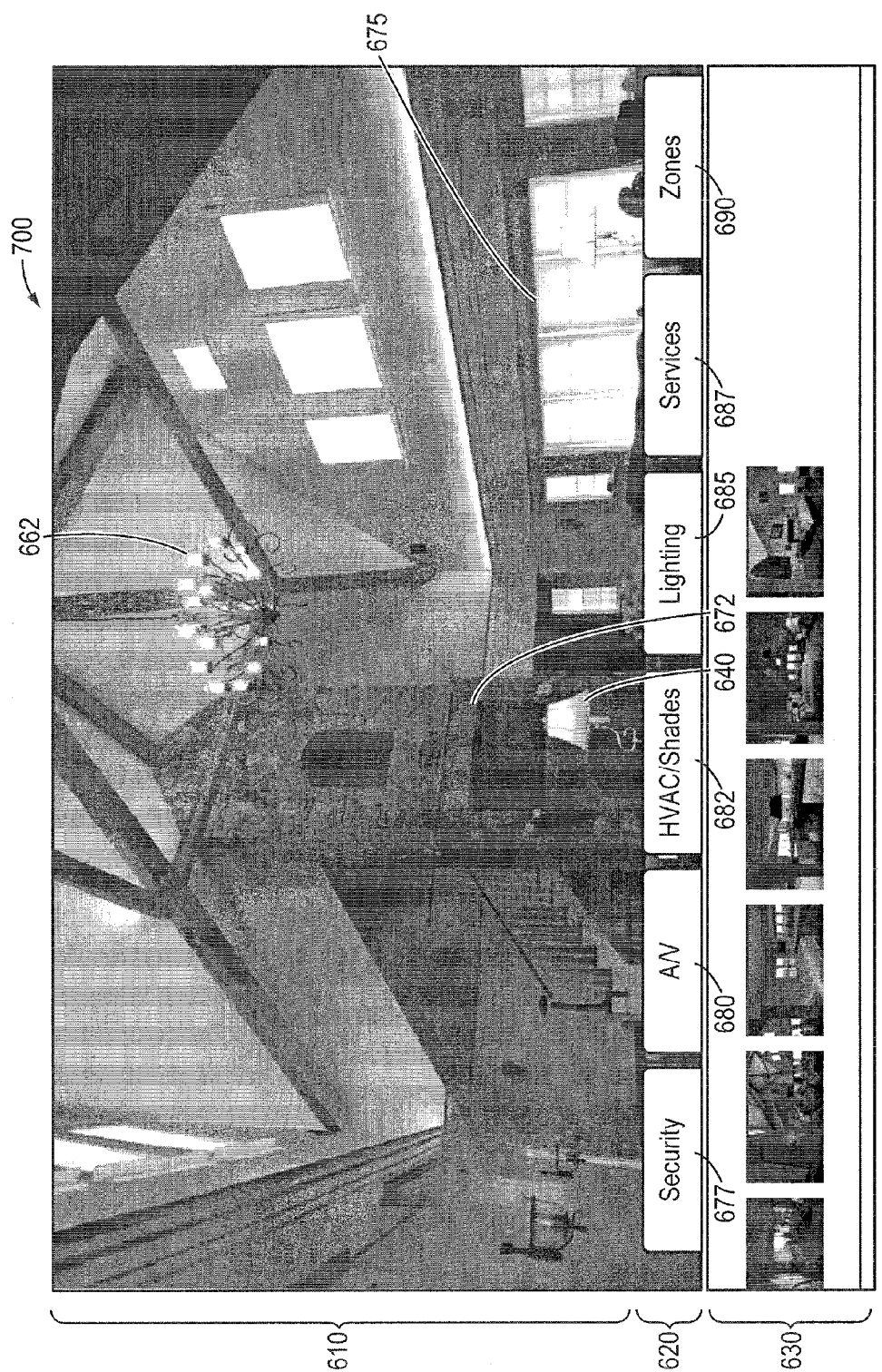
FIG. 7 is a diagram of an example virtual room-based user interface in which the virtual room has been updated to show particular light fixtures activated.

FIG. 7 is a diagram of an example virtual room-based user interface 700 in which the virtual room has been updated to show particular light fixtures activated. As can be seen in FIG. 7, the substantially photo-realistic visual depictions of the lamp 640 and the chandelier 662 have been changed to depict the light fixtures illuminated. Further, the effects of such illumination are depicted in the virtual room, such that the structure and furnishings show the effects of the light provided by the lamp 640 and the chandelier 662. For instance, realistic reflections are shown on reflective surfaces, appropriate shadows are shown given the direction of the light, etc. As discussed in more detail below, the updated appearance of the virtual room, including the realistic lighting effects, may be rendered based upon a limited number of prerecorded images, for example, a limited number of still digital photographs of the physical room, captured from a predetermined location and showing the room in differing states. Alternatively, a variety of other techniques for creation of the substantially photo-realistic depictions of the room and devices therein, in differing states, may be employed.

Furthermore, a user may select a device other than a light fixture in the physical room to activate and/or control by selecting, e.g., touching or clicking on, the substantially photo-realistic visual depiction of the device within the virtual room. For example, a user may select, e.g., touch or click on, the substantially photo-realistic visual depiction of the flat-screen television 672 within the virtual room. In response thereto, the programmable multimedia controller 400 may send control commands to activate the flat-screen television. Further, the programmable multimedia controller 400 may update the virtual room, such that it shows a substantially photo-realistic depiction of the physical room with the television activated. For example, a miniature depiction of the programming currently being displayed on the television may be shown on the substantially photo-realistic depiction of the flat-screen television 672 within the virtual room. In similar manner, a variety of other types of A/V devices associated with the physical room may be controlled.

Similarly, a user may select, e.g., touch or click on, the substantially photo-realistic visual depiction of a particular set of window shades 675 within the virtual room. In response thereto, the programmable multimedia controller 400 may send control commands to one or more motor operated device controllers 495 to raise or lower the selected shades, as appropriate. Further, the programmable multimedia controller 400 may update the virtual room, such that it shows a substantially photo-realistic depiction of the shades 675 raised or lowered. In such manner, what a user views within the virtual room may mirror, or at least resemble, their experience within the corresponding physical room.

In addition to supporting binary (e.g., off/on) selections within the virtual room, the virtual room-based user interface may support more advanced types of control input. Such more advanced control may be supported via the menu portion 620 of the virtual room-based user interface and the function specific portion 630 of the virtual room-based user interface. It may alternatively be supported by gesture recognition in the main portion 610 of the virtual room-based user interface.

The menu portion 620 of the interface may include a plurality of function tabs, for example, a Security Tab 677 in which certain additional functionality related to a CCTV system and/or security system may be accessed, an A/V Tab 680 in which certain additional audio and video related functionality may be accessed, an HVAC/Shades Tab 682 in which certain additional functionality related to HVAC systems and/or automatic window shades systems may be accessed, a Lighting Tab 685 in which certain additional functionality related to light fixture control may be accessed, a Services Tab 687 in which certain functionality related to programmable services may be accessed, and a Zones Tab 690 in which different virtual rooms may be selected for display in the main portion 610 of the screen.

Upon selection of a particular tab, the function specific portion 630 of the user interface may show selectable icons, buttons, text and the like related to such functionality. For instance, the example virtual room-based user 600 of FIG. 6 interface depicts the Zones Tab 690 selected, and the function specific portion 630 shows a plurality of selectable images 691, 692, 693, 694, 695, 696 corresponding to different available virtual rooms, each virtual room corresponding to a different physical room (or portion of a physical room) in the home or other structure. In response to selection, e.g., touch, of a particular image 691, 692, 693, 694, 695, 696 of a different room, the main portion 610 of the virtual room-based user interface may be updated to display the corresponding different virtual room.

Figure 8A:
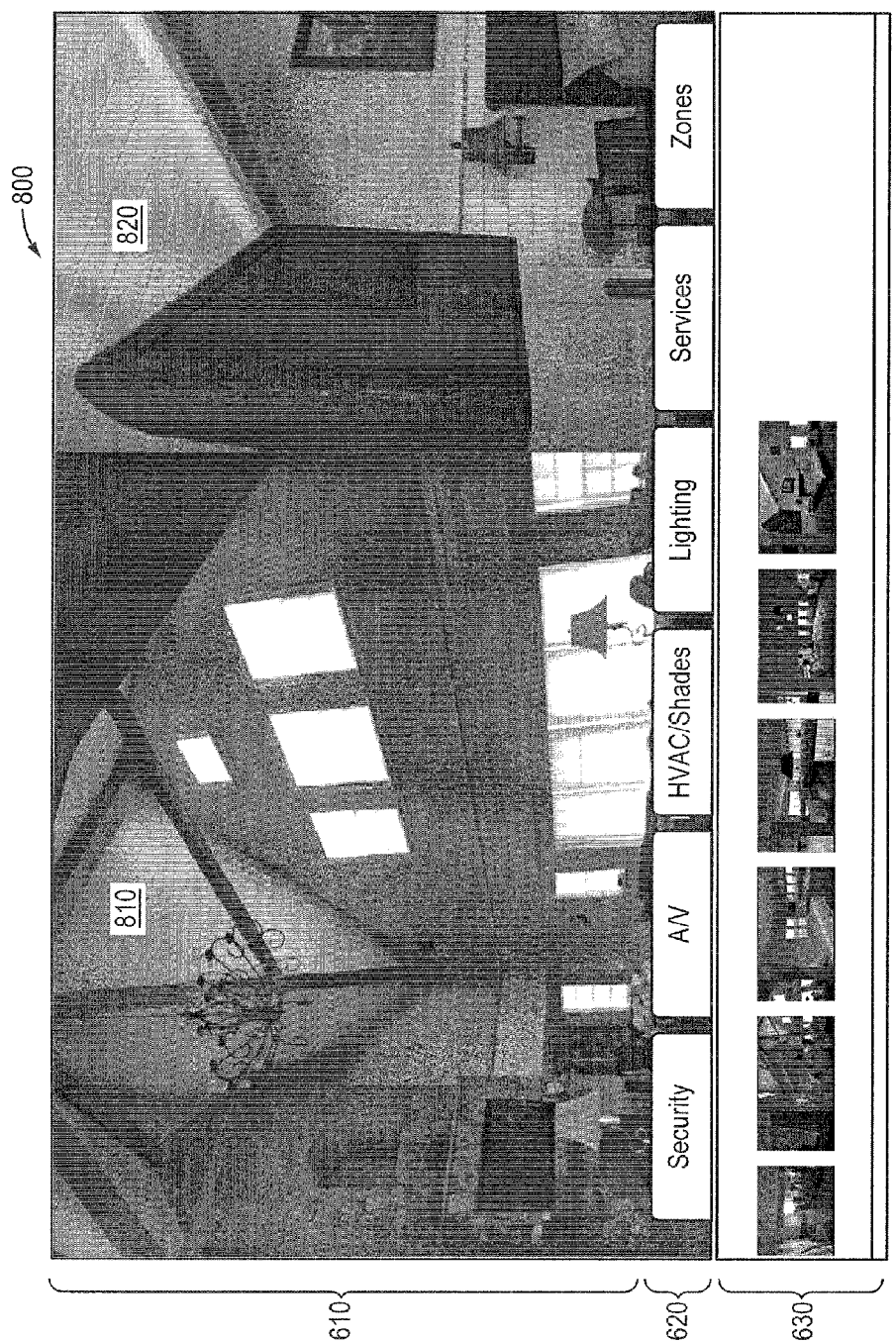
FIG. 8A is a diagram of an example virtual room-based user interface in which portions of two virtual rooms are shown in mid-advance, for example, in response to a user's swipe.
Figure 8B:
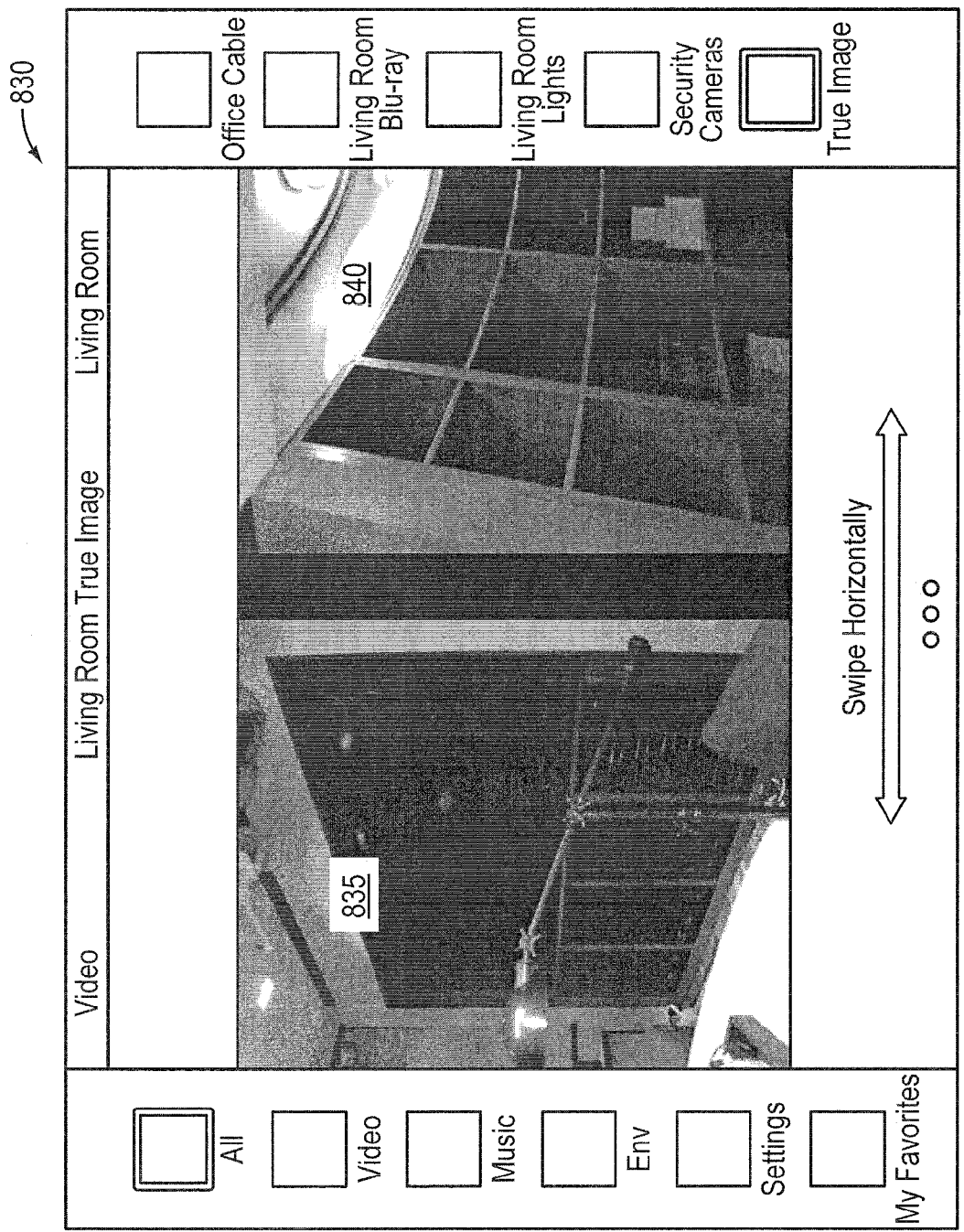
FIG. 8B is a diagram of an alternative example virtual room-based user interface in which portions of two virtual rooms corresponding to the same physical room are shown in mid-advance, for example, in response to a user's swipe.

Alternatively, different virtual rooms may be selected via gestures, for example, touch-based gestures. For instance, virtual rooms may be logically arranged in a linear or circular array. A user may "swipe," for example, with their finger, a stylus, or similar implement on a touch sensitive display, for example in the main portion 610 of the virtual room-based user interface to advance from one virtual room to the next. As used herein, the term "swipe" refers to a rapid continuous, substantially linear motion in the user interface. In response thereto, the virtual room displayed in the main portion 610 of the virtual room-based user interface may be advanced. FIG. 8A is a diagram of an example virtual room-based user interface 800 in which portions of two virtual rooms 810, 810 corresponding to different physical rooms are shown in mid-advance, for example, in response to a user's swipe. Since virtual rooms may also correspond to a portion of a physical room, swiping may alternatively be used to advance between virtual rooms that correspond to a portion of the same physical room. FIG. 8B is a diagram of an alternative example virtual room-based user interface 830 in which portions of two virtual rooms 835, 840 corresponding to the same physical room are shown in mid-advance, for example, in response to a user's swipe.

In other embodiments, virtual rooms may be logically arranged in more complicated arrangements. For example, in some configurations, virtual rooms and/or groups of virtual rooms may be arranged in a tree structure. Depending upon the current level of the tree structure the user is interacting with, various gestures may perform differing functions. Such an arrangement may be used in conjunction with a variety of type of gestures, including "multi-touch" gestures, that is, gestures that involve selection of two or more points in the user interface. Alternatively, such an arrangement may be used with other types of controls, for example with a pointer and mouse control scheme.

Figure 8C:
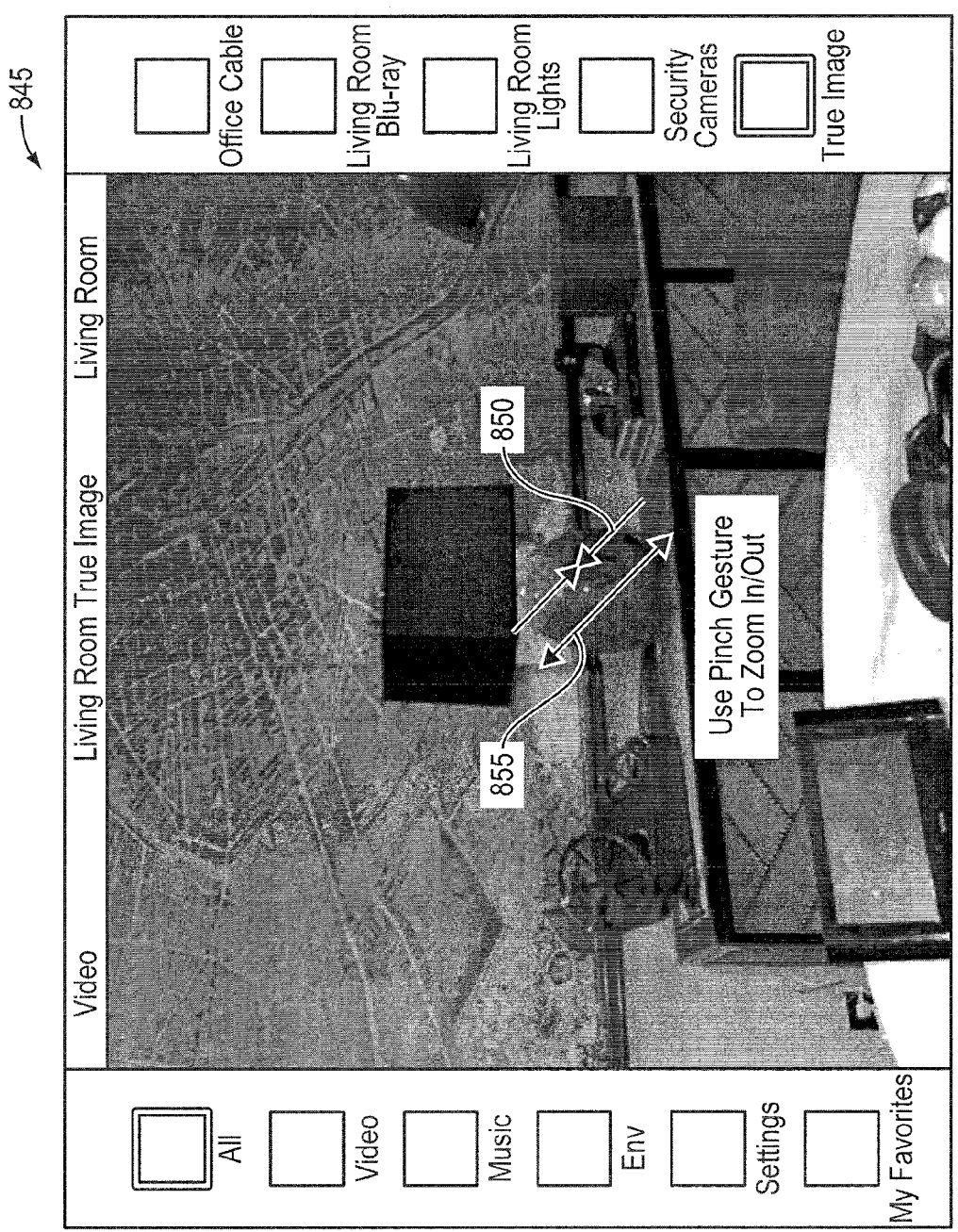
FIG. 8C is a diagram of an alternative example virtual room-based user interface showing a virtual room corresponding to a lower level of a tree structure of virtual rooms.

FIG. 8C is a diagram of an alternative example virtual room-based user interface 845 showing a virtual room corresponding to a lower level of a tree structure of virtual rooms. While a user is viewing a virtual room at this level, the user may make a multi-touch "contract gesture" 850. As used herein, the term "contract gesture" refers to a selection of two points in the user interface and a dragging of such points towards one another in a substantially continuous motion. In response, the interface may "zoom in" on a portion of the virtual room about the location the gesture was made. Similarly, the user may make a multi-touch "expand gesture" 855. As used herein, the term "expand gesture" refers to a selection of two points in the user interface and a dragging of such points away from one another in a substantially continuous motion. In response, the interface may "zoom out" to show a greater portion of the virtual room.

Figure 8D:
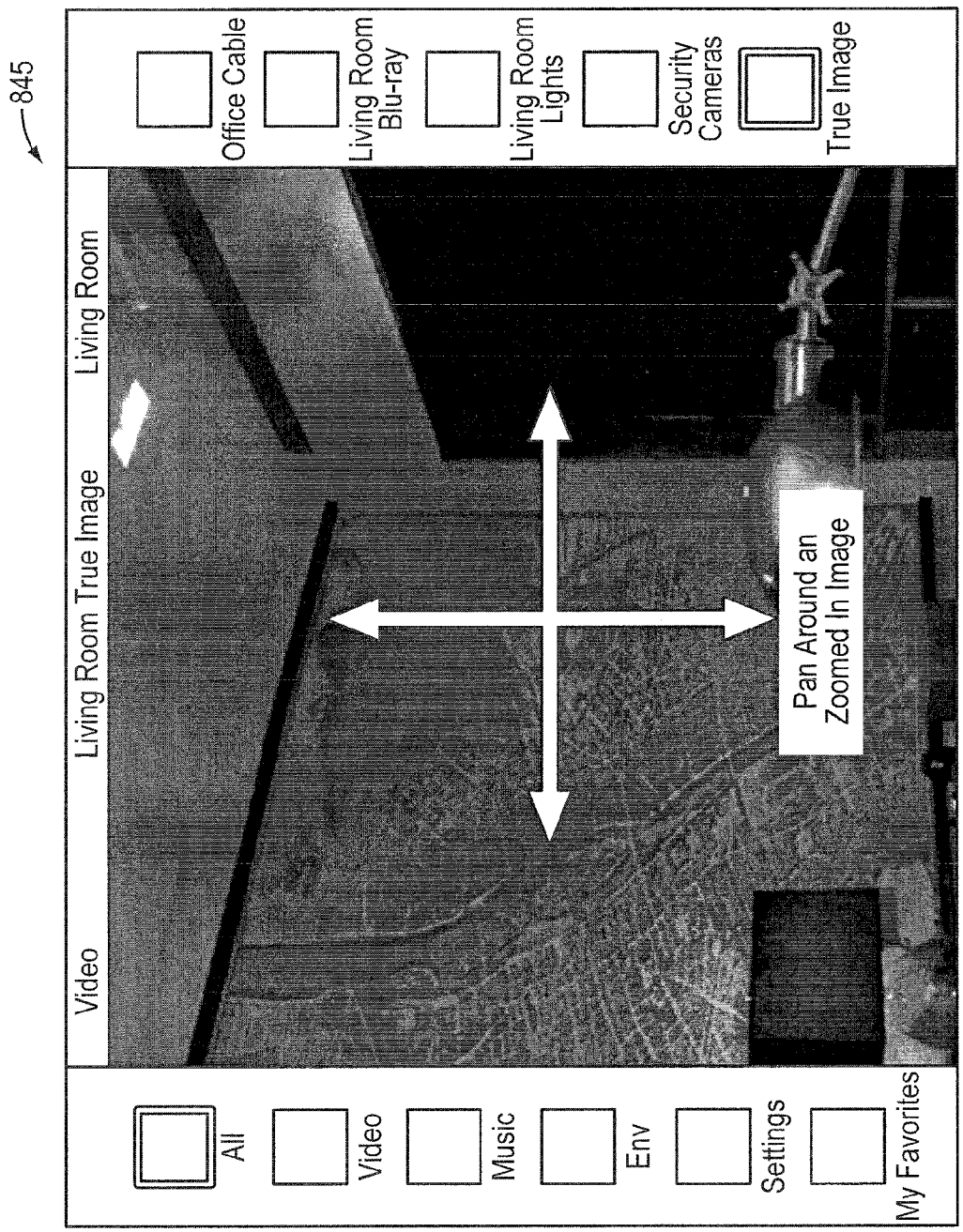
FIG. 8D is a diagram of an alternative example virtual room-based user interface showing a virtual room corresponding to a lower level of a tree structure of virtual rooms that illustrates additional usage of gestures.

FIG. 8D is a diagram of an alternative example virtual room-based user interface 860 showing a virtual room corresponding to a lower level of a tree structure of virtual rooms that illustrates additional usage of gestures. In such an alternative embodiment, the user may make a "drag gesture" 865 in one of several directions, for example, up, down, left or right. As used herein, the term "drag gesture" refers to a continuous, substantially linear motion in the user interface. In response to the drag gesture, the interface may pan within the virtual room in a corresponding direction, if there are portions of the virtual room that are not presently shown in the viewable area of the interface.

Figure 8E:
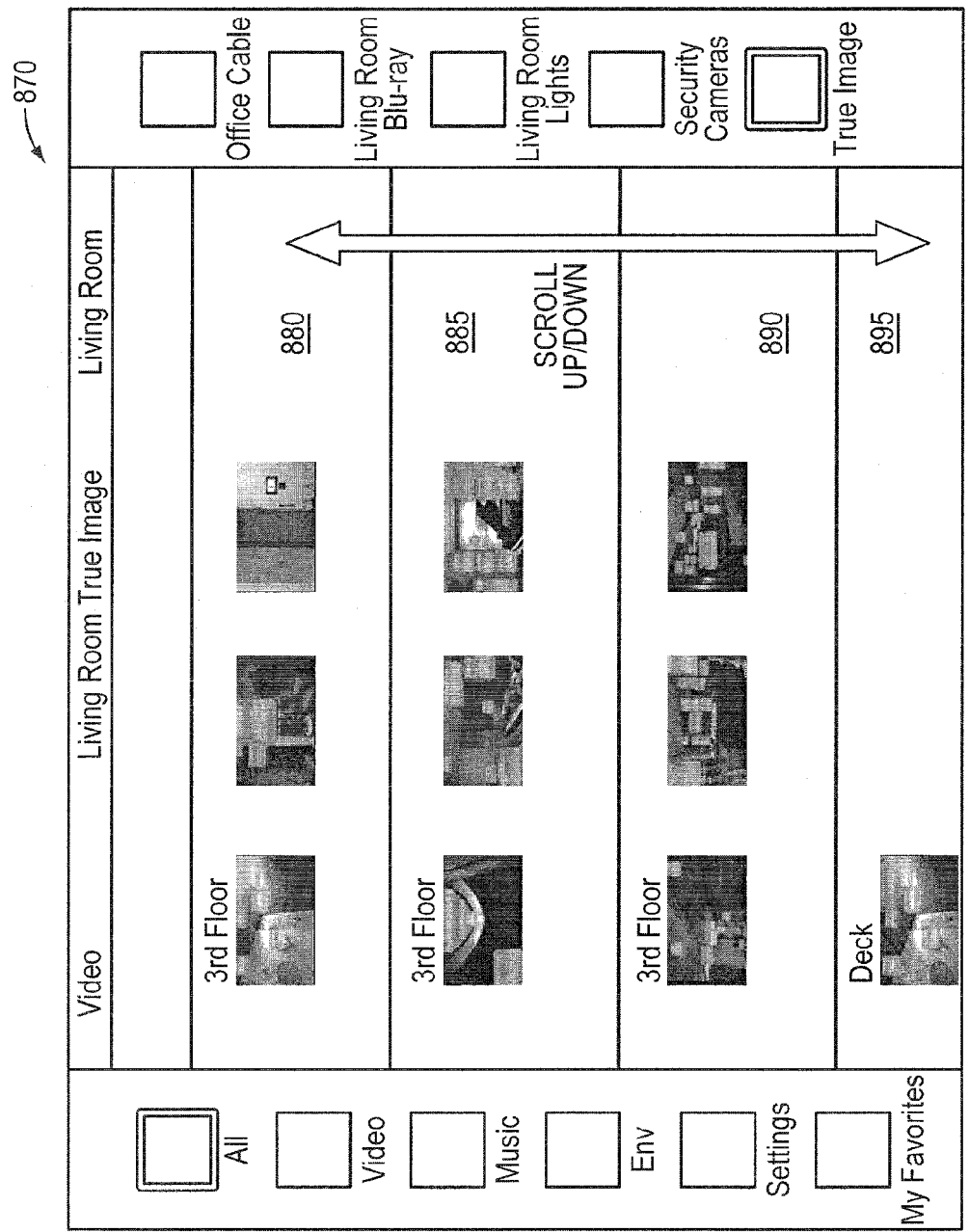
FIG. 8E is a diagram of an alternative example virtual room-based user interface showing a plurality of virtual rooms, arranged into groups within a tree structure of virtual rooms.

In such an alternative embodiment, if a user "zooms out" a sufficient amount, the user may be displayed a higher level of the tree structure. FIG. 8E is a diagram of an alternative example virtual room-based user interface 870 showing a plurality of virtual rooms, arranged into groups within a tree structure of virtual rooms. In one configuration, a first group 890 may correspond to a "1$^{st}$ Floor" of a structure and include one or more virtual rooms associated with that floor, a second group 885 may correspond to a "2$^{nd}$ Floor" of a structure and include one or more virtual rooms associated with that floor, a third group 880 may correspond to a "3$^{rd}$ Floor" of a structure and include virtual rooms associated with that floor, while an additional group 895 may correspond to an exterior of a structure and include virtual rooms associated therewith. It should be understood, such grouping is merely an example, and a wide variety of other configurations may be readily implemented. To revist a lower level of the tree structure of virtual rooms, the user may select one of the virtual rooms shown in the interface 870.

Figure 9:
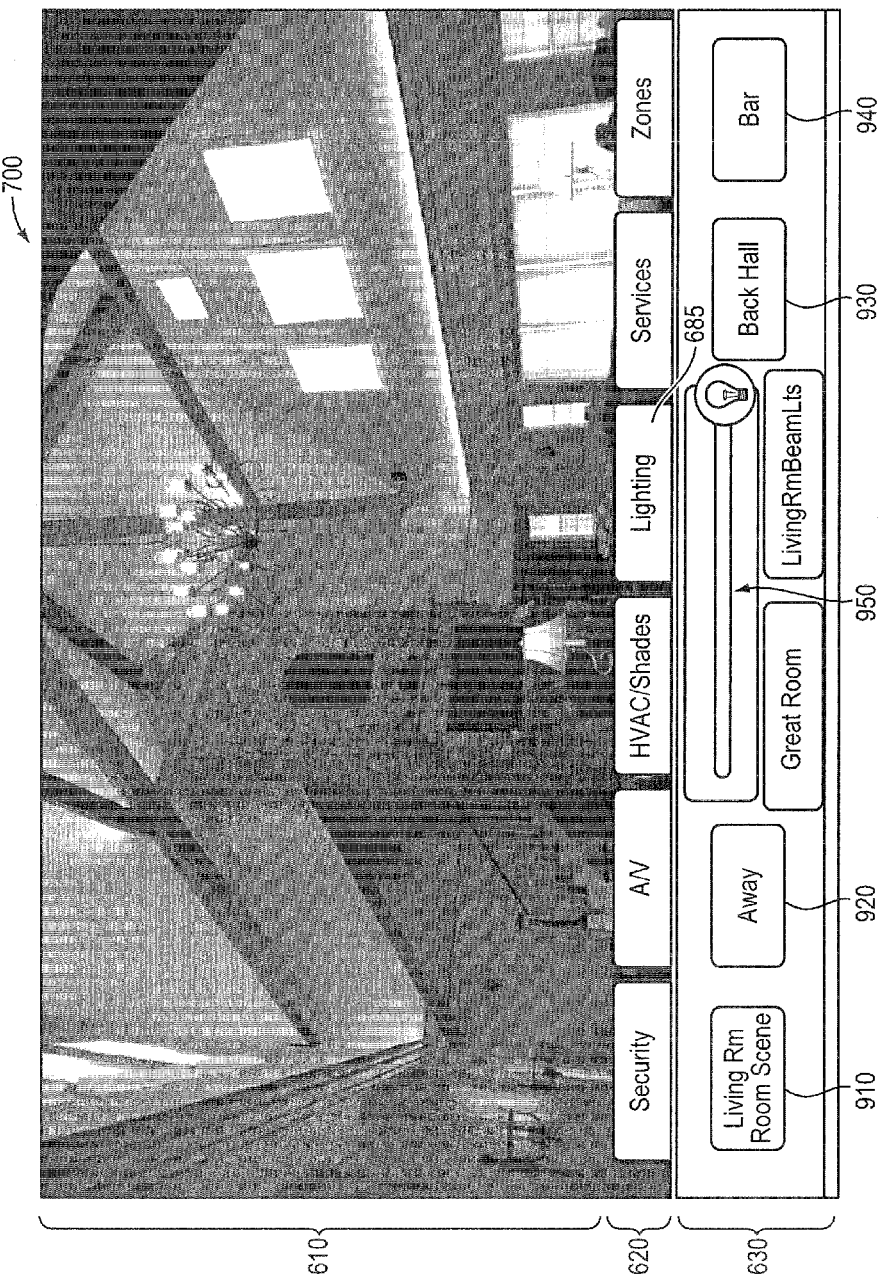
FIG. 9 is a diagram of an example virtual room-based user interface in which a Lighting Tab is selected.

Returning to FIG. 6, similar to selection of the Zones Tab 690, selection of the Lighting Tab 685 may provide access to selectable icons, buttons, text and the like in the function specific portion 630 of the user interface, in this instance, related to lighting control. FIG. 9 is a diagram of an example virtual room-based user interface 900 in which the Lighting Tab 685 is selected. As shown in FIG. 9, the function specific portion 630 of the example user interface 900 may include a plurality of buttons 910, 920, 930, 940 coral responding to various lighting "scenes," selection of which will activate, deactivate, and/or permit dimming/brightening of a plurality of light fixtures in the room. Further, the function specific portion 630 of the example virtual room-based user interface 900 may include one or more dimming sliders 950, which when operated may cause the programmable multimedia controller 400 to issue commands to one or more electronic lighting controllers 490, to cause such controllers to adjust dimmer units 493 wired inline with the electrical feed to individual light fixtures, or groups of light fixtures.

Alternatively, gestures, for example, touch-based gestures may be used to cause the programmable multimedia controller 400 to issue commands to one or more electronic lighting controllers 490 to cause such controllers to adjust dimmer units 493 wired inline with the electrical feed to individual light fixtures, or groups of light fixtures. A user may make a gesture, for example, a touch-based gesture, on or about a substantially photo-realistic depiction of a particular light fixture or group of light fixtures. Such gesture may be translated into a brightening or dimming control command. For example, the user may make a multi-touch "expand" on or about the substantially photo-realistic depiction of a particular light fixture and dragging such points in opposing directions, to indicate the corresponding light fixture should be brightened. Similarly, the user may make a multi-touch "contract" gesture on or about the substantially photo-realistic depiction of a particular light fixture to indicate the corresponding light fixture should be dimmed. In addition to "expand" and "contract" gestures, support for a variety of other gestures is expressly contemplated to for use with controlling brightness of light fixtures or the settings of other devices.

Further, the A/V Tab 680 may provide access to selectable icons, buttons, text and the like in the function specific portion 630 of the user interface for A/V device control. For example, a user may choose an A/V device under control of the programmable multimedia controller 400, for example, a television, by selecting, e.g., touching, the substantially photo-realistic representation of the device in the virtual room displayed in the main portion 610 of the virtual-room based user interface. Thereafter, the user may be presented with device-specific control icons, buttons, text and the like, manipulation of which may control the selected device.

Figure 10:
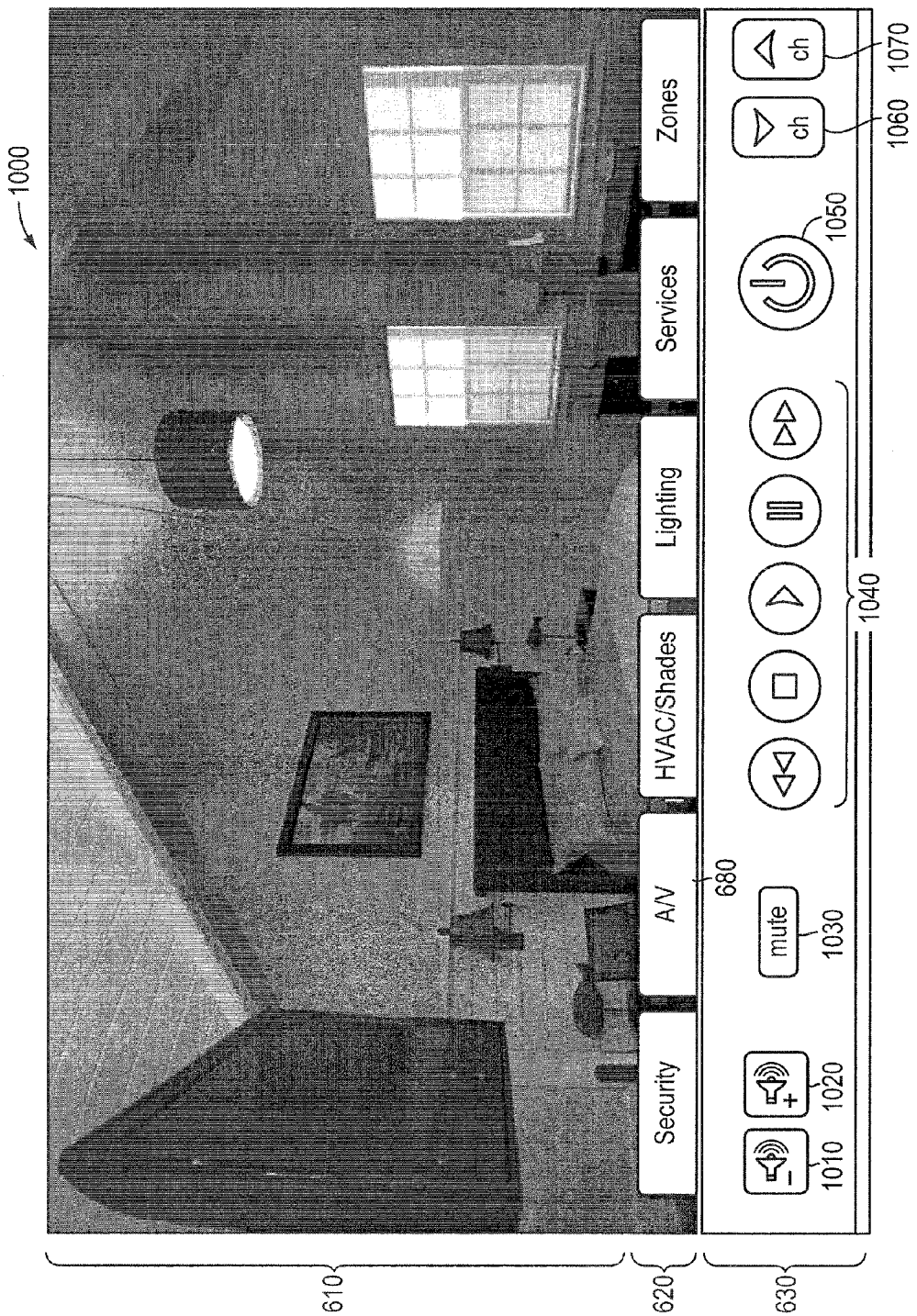
FIG. 10 is a diagram of an example virtual room-based user interface in which an A/V Tab is displayed.

FIG. 10 is a diagram of an example virtual room-based user interface 1000 in which the A/V Tab 685 is displayed. As shown in FIG. 10, the function specific portion 630 of the example virtual room-based user interface 1000 may include a plurality of A/V related buttons, for example, volume buttons 1010, 1020, a mute button 1030, playback control buttons 1040, a power button 1050, and/or channel selection buttons 1060, 1070.

Figure 11:
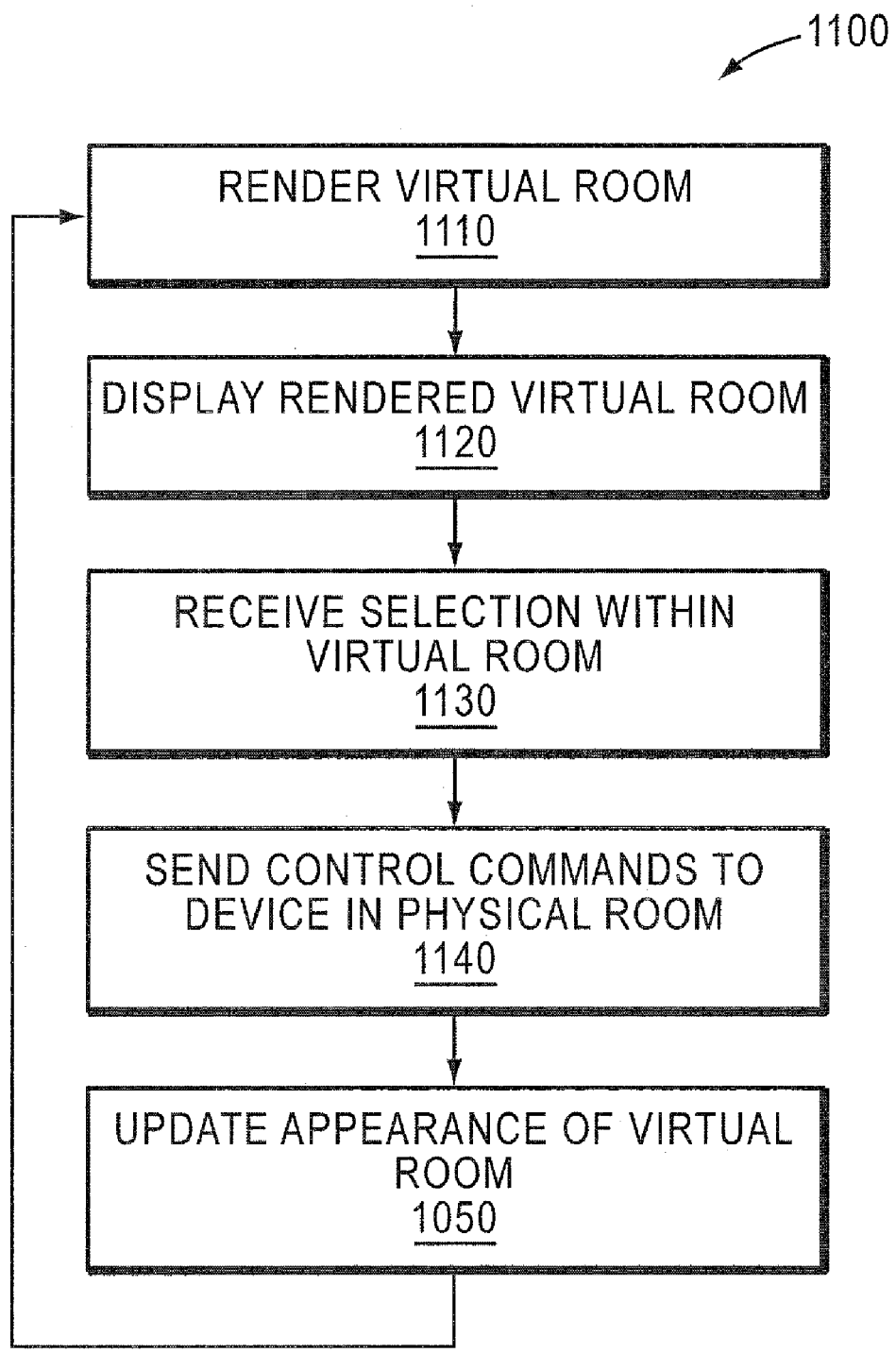
FIG. 11 is a flow diagram of an example sequence of steps for controlling devices within a physical room using a virtual room-based user interface.

FIG. 11 is a flow diagram of an example sequence of steps 1100 for controlling devices within a physical room using a virtual room-based user interface. At step 1110, the programmable multimedia controller 400 renders a virtual room, including the substantially photo-realistic depiction of the physical room (or a portion of the physical room) and the substantially photo-realistic depictions of the devices, for example, the light fixtures, within the physical room. At step 1120, the rendered virtual room is displayed on the display screen of a control unit 450, a mobile device 460, the front panel display 465 of the programmable multimedia controller 400, a television 440 or, alternatively, on another device. At step 1130, the multimedia controller 400 receives a selection, for example, a touch selection, button-press, annular touch sensor input, etc. from a user. The selection indicates a particular substantially photo-realistic visual depiction of a device, for example, of a particular light fixture, within the virtual room.

At step 1140, the programmable multimedia controller 400 sends control commands to the device in the physical room, or to an intermediate controller coupled to the device, to change a state of the device. For example, the programmable multimedia controller 400 may send control commands to one or more electronic lighting controllers 490 to cause such controllers to activate a relay 492 wired inline with the electrical feed to a selected light fixture. At step 1150, the programmable multimedia controller 400 updates the appearance of the virtual room, and loops to step 1010, to render the virtual room and visual depictions of the devices in the virtual room, to show the updated state, for example to show the light fixture activated.

The virtual room, including the substantially photo-realistic depiction of the physical room and the substantially photo-realistic depictions of the devices within the physical room may be rendered in step 1110 of FIG. 11 in any of a variety of different manners. In one embodiment, an installer during system configuration may capture images, for example, take still digital photographs, of the physical room from a predetermined location, each image captured of the room while it is in a different potential state. For example, a first image may be captured of the physical room with no light fixtures activated, a second image may be captured of the physical room with a first light fixture activated, a third image may be captured of the physical room with a second light fixture activated, a forth, image may be captured of the physical room with the first light fixture and the second light fixture activated, and so forth such that every potential combination is captured. The images may be correlated, such that features coincide in location between images, and stored in a library on the programmable multimedia controller 400, or on another device. In such an embodiment, the rendering step 1110 may involve simply accessing the appropriate stored image of the physical room that shows the room with devices in the appropriate states.

However, while such technique may be feasible in certain applications, as the number of devices in the room increases, the number of prerecorded images needed to represent the room in each potential state grows exponentially. A room with n devices may require $2^n$ prerecorded image to represent all the possible combinations of devices, assuming each device has only binary states (e.g., on or off). The introduction of devices having more than two possible states, for example, a range of dimmer settings, may further increase the number of prerecorded images needed. Accordingly it is desirable to use a technique that may derive additional states of the room from a lesser number of prerecorded images.

In the preferred embodiment, the virtual room, including the substantially photo-realistic depiction of the physical room and the substantially photo-realistic depictions of the devices within the physical room, is rendered in step 1110 of FIG. 11 from a limited number of prerecorded images, for example, a limited number of digital still photographs of the physical room. During system configuration, an installer captures from a predetermined location an image of the room with no devices activated, as well as images of the room with each device in the room activated singly (i.e. activated without any other devices in the room activated). For example, a first image may be captured of the physical room with no light fixtures activated, a second image may be captured of the physical room with just a first light fixture activated (preferably at maximum brightness), a third image may be captured of the physical room with just a second light fixture activated (preferably at maximum brightness), a forth image may be captured of the physical room with a just a third light fixture and activated (preferably at maximum brightness), and so forth. For a room with n devices, n+1 images may be captured. The n+1 images may be correlated such that features coincide in location between images, and the images may be stored in a library on the programmable multimedia controller 400, or another device. Then, according to a novel mixing technique, all of the possible states of the room may be generated at display-time from the n+1 prerecorded images.

Figure 12:
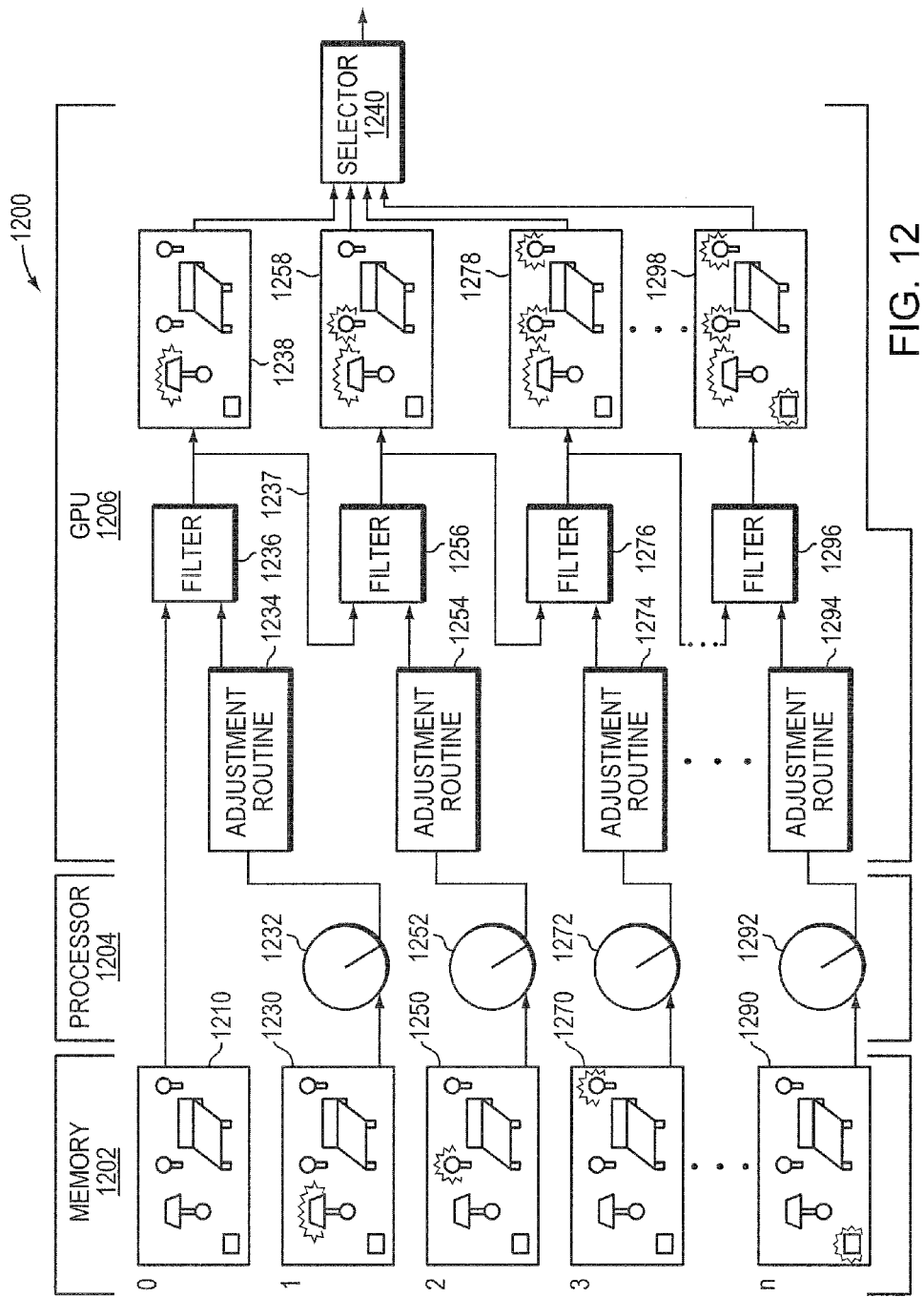
FIG. 12 is a functional block diagram depicting an example technique for rendering a virtual room based on a limited number of prerecorded images of the physical room in different states.

FIG. 12 is a functional block diagram 1200 depicting an example technique for rendering a virtual room based on a limited number of prerecorded images of the physical room in different states. The limited number of images may be stored in an image repository, for example, a memory 1202 of the programmable multimedia controller 400 or other device. The images include a first image 1210 of the physical room with no devices, for example, light fixtures, activated, a second image 1230 of the physical room with just a first device activated, for example, a first light fixture activated (preferably at maximum brightness), a third image 1250 of the physical room with just a second device activated, for example, a second light fixture activated (preferably at maximum brightness), a forth image 1270 of the physical room with a just a third device activated, for example, a third light fixture activated (preferably at maximum brightness), up to an $n^{th}$ image 1290 of the room with just an $n^{th}$ device activated, for example, an $n^{th}$ light fixture activated (preferably at maximum brightness).

The images 1210, 1230, 1250, 1270, 1290 may be accessed by a processor 1204, for example, of the programmable multimedia controller 400 or another device, that implements binary virtual controls 1232, 1252, 1272, 1292. The binary virtual controls may be software routines that, in response to a user's selection of the visual depiction of the device in the virtual room-based user interface, either passes a corresponding image showing the device activated, or blocks the image. When passed, the images are received at a graphical processing unit (GPU) 1206, for example of the programmable multimedia controller 400 or of another device.

The GPU 1206 preferably implements a plurality of adjustment routines 1234, 1254, 1274, 1294 that adjust properties of the images 1230, 1250, 1270, 1290. For example, in an implementation where the devices are each light fixtures, the adjustment routines 1234, 1254, 1274, 1294 may be dimmer routines that adjust the brightness of the images 1230, 1250, 1270, 1290, for instance from between 0% and 100%, in response to dimmer selections made by a user in the virtual room-based user interface.

Further, the GPU 1206 preferably implements a plurality of filter routines 1236, 1256, 1276, 1296 that receive two or more images, and filter the images on a pixel-by-pixel basis, to produce output images 1238, 1258, 1278, 1298. The received images may include adjusted images provided by the adjustment routines 1234, 1254, 1274, 1294, as well as output images provided by previous filter routines 1236, 1256, 1276 via paths 1237, 1257, 1277. In an implementation where the devices are each light fixtures, filter routines 1236, 1256, 1276, 1296 may select among corresponding pixels in each received image the pixel having the greatest pixel value (e.g., the greatest brightness), and generate the output image 1238, 1258, 1278, 1298 from such pixels. In such manner, the illumination effects of various light fixtures may be effectively combined. Further, by feeding the output image from a filter routine to the next successive filter routine, accumulated illumination effects from a plurality of different light fixtures activated at once may be approximated.

A selector 1240 of the GPU 1206 selects the appropriate output image 1238, 1258, 1278, 1298 that represents the combination of devices activated in the room. Such output image is then provided for display in the virtual room-based user interface, for example, the image is used in displaying step 1120 of FIG. 11.

While the above description discusses certain example embodiments, it should be apparent that a number of modifications and/or additions may be made thereto.

For example, while it is discussed above that the devices controlled via the virtual room-based user interface are located within a room of a home or other structure, such as a great room or kitchen, it should be understood that the techniques may be used with a variety of other types of rooms found in different types of structures. For example the virtual room may correspond to (or correspond to a portion of) a conference room, a board room, a show room, a class room, a restaurant or bar dining room, a factory floor, a warehouse space, etc. Further, the devices need not be located within any type of "room". For example, devices that are located external to the home or structure, such as exterior light fixtures, may also be controlled via the virtual room-based user interface. In such an implementation, one or more virtual rooms may be defined for outdoor spaces, each virtual room including a substantially photo-realistic depiction of a particular portion of outdoor space.

Similarly, devices located in multiple homes or other structures may be controlled via the virtual room-based user interface. In such an implementation, one or more virtual rooms may be defined for each different structure. In some implementations, each structure may include its own programmable multimedia controller 400 coupled to devices and intermediate controllers, for example, to electronic lighting controllers 490, motor operated device controllers 495, and the like. A network, for example, a wide area network (WAN) may interconnect the programmable multimedia controllers 400, and allow control commands to passed there between. Such a configuration may allow a user operating a virtual room-based user interface in a first structure, to active, deactivate and/or adjust the operation of devices located in a second structure remote from the first structure.

Further, while it is discussed above that the substantially photo-realistic depictions of the room and devices used to create each virtual room may be rendered from images, for example, from digital still photographs, the substantially photo-realistic depictions may be rendered in other manners. For example, the substantially photo-realistic depictions may be rendered from full-motion video, rather than still photographs. In such an alternative implementation, the full-motion video may be captured in advance, during system configuration, and stored, or may comprise at least some live full-motion video of the physical room (or portion thereof) of the home or other structure, for example, captured live by one or more cameras coupled to the CCTV control system 470. Similarly, the substantially photo-realistic depictions may be rendered from high-definition three-dimensional (3-D) laser scans or other types of high-definition surveying of the rooms of the home or other structure. In such an alternative implementation, a high-definition computer aided design (CAD) model may be built for each room, based on the data captured in the 3-D laser scans or other types of surveying, and such model used in the rendering.

Further, while may be implied above that the control units 450, button-centric remote control units and/or wall mounted button-centric control units 455, remote control units including an annular touch sensor 457, mobile devices 460, front panel 465 and/or video output devices 440, coupled to programmable multimedia controller 400 are located within the home or other structure, it should be understood that at least some of these devices may be located remotely, and enable a user to interact with the system remotely, for example, via the Internet. For instance, the programmable multimedia controller 400 may be coupled via a network interface (not shown) to the Internet. The virtual room-based user interface may be displayed to a user within a web browser or other application, on a device located far remote from the home or structure.

User selections may be forwarded over the Internet to the programmable multimedia controller 400. In such manner, a user may be able to control devices within the home or structure remotely, over great distances, and view the effects of their control selections.

Additionally, it should be understood that the procedures or processes described above may be implemented in hardware, software (embodied as a computer-readable medium containing program instructions), firmware, or a combination thereof. A computer-readable medium may take the form of a memory, such as a Random Access Memory (RAM), a disk, such as a CD-ROM, or other tangible storage medium.

Therefore, it should be understood that the above descriptions are meant to be taken only by way of example.

What is claimed is:

1. A method for controlling one or more devices within a physical room of a structure, comprising:
    coupling the one or more devices in the structure, either directly or indirectly, to a programmable multimedia controller configured to issue control commands which, when implemented, change the state of the one or more devices;
    displaying, on a display screen, a virtual room-based user interface, the virtual room-based user interface including one or more of virtual rooms, each virtual room including a substantially photo-realistic depiction of a portion of the structure, the substantially photo-realistic depiction of a portion of the structure including substantially photo-realistic visual depictions of one or more boundaries of the portion of the structure, one or more furnishings located within the portion of the structure, and one or more devices located within the portion of the structure;
    receiving a selection of a particular substantially photo-realistic visual depiction of a particular device within a particular virtual room;
    in response to the selection of the particular substantially photo-realistic visual depiction of the particular device, issuing, by the programmable multimedia controller, control commands which, when implemented, change the state of the particular device; and
    updating the appearance of the particular virtual room, such that the substantially photo-realistic visual depiction of the particular device, as well as the substantially photo-realistic visual depictions of the one or more boundaries of the portion of the structure and of the one or more furnishings located within the portion of the structure, reflect the changed state of the particular device.

2. The method of claim 1 wherein the one or more devices include one or more light fixtures, the selection of the particular substantially photo-realistic visual depiction corresponds to a substantially photo-realistic visual depiction of a particular light fixture, and the control commands, when implemented, change the state of the particular light fixture by changing the particular light fixture's illumination.

3. The method of claim 2 wherein the changing the particular light fixture's illumination further comprises:
    turning the particular light fixture on or off.

4. The method of claim 3 wherein the updating the appearance of the particular virtual room further comprises:
    showing a substantially photo-realistic depiction of the physical room with the particular light fixture illuminated.

5. The method of claim 1 wherein the one or more devices include one or more A/V devices, the selection of the particular substantially photo-realistic visual depiction corresponds to a substantially photo-realistic visual depiction of a particular A/V device, and the control commands, when implemented, change the state of the particular A/V device.

6. The method of claim 1 wherein the one or more devices include one or more automatic window shades, the selection of the particular substantially photo-realistic visual depiction corresponds to a substantially photo-realistic visual depiction of a particular automatic window shade, and the control commands, when implemented, raise or lower the particular automatic window shade.

7. The method of claim 1 wherein the one or more of virtual rooms each correspond to a portion of a physical room of the structure and the one or more boundaries of the portion of the structure are boundaries of the physical room and the one or more furnishings located within the portion of the structure are furnishings present in the physical room.

8. The method of claim 1 wherein the virtual room-based user interface includes one or more additional virtual rooms, at least one additional virtual room including a substantially photo-realistic depiction of an outdoor space and including substantially photo-realistic visual depictions of one or more devices located within the outdoor space.

9. The method of claim 1 further comprising:
    coupling a control unit, either directly or indirectly, to the programmable multimedia controller; and
    wherein the displaying a virtual room-based user interface displays the virtual room-based user interface on a display screen of the control unit and the receiving a selection of a particular substantially photo-realistic visual depiction of a particular device receives the selection on the control unit.

10. The method of claim 9 wherein the display screen of the control unit is a touch-screen display and the receiving a selection of a particular substantially photo-realistic visual depiction comprises:
    receiving a touch on the touch-screen display about the particular substantially photo-realistic visual depiction.

11. The method of claim 1 further comprising:
    providing a mobile device that is configured to communicate with the programmable multimedia controller; and
    wherein the displaying a virtual room-based user interface displays the virtual room-based user interface on a display screen of the mobile device and the receiving a selection of a particular substantially photo-realistic visual depiction of a particular device receives the selection on the mobile device.

12. The method of claim 11 wherein the mobile device is a one of a multimedia smartphone, a multi-purposes tablet computing device, and a portable media player.

13. The method of claim 1 further comprising:
    coupling a television, either directly or indirectly, to the programmable multimedia controller; and
    coupling a remote control unit, either directly or indirectly, to the programmable multimedia controller;
    wherein the displaying a virtual room-based user interface displays the virtual room-based user interface on a display screen of the television and the receiving a selection of a particular substantially photo-realistic visual depiction of a particular device receives the selection on the remote control unit.

14. The method of claim 1 further comprising:
    capturing a first number of photographs of the portion of the structure; and
    deriving the photo-realistic depiction of the portion of the structure in each of a second number of states, wherein the second number is greater than the first number.

15. An apparatus for controlling one or more devices within a physical room of a structure, comprising:
- a display screen;
- a programmable multimedia controller coupled to the one or more devices in the structure and configured to issue control commands which, when implemented, change a state of the one or more devices, the programmable multimedia controller further configured to cause display of a virtual room-based user interface on the display screen, the virtual room-based user interface including one or more of virtual rooms, each virtual room including a substantially photo-realistic depiction of a portion of the structure, the substantially photo-realistic depiction of a portion of the structure including substantially photo-realistic visual depictions of one or more boundaries of the portion of the structure, one or more furnishings located within the portion of the structure, and one or more devices located within the portion of the structure, the appearance of the one or more boundaries of the portion of the structure and the one or more furnishings located within the portion of the structure dependent upon the state of the one or more devices;
- an interface device configured to receive a selection of a particular substantially photo-realistic visual depiction of a particular device within a particular virtual room;
- wherein the programmable multimedia controller is further configured to, in response to the selection of the particular substantially photo-realistic visual depiction of a device, issue control commands which, when implemented, change the state of the particular device.

16. The apparatus of claim 15 wherein the programmable multimedia controller is further configured to update the appearance of the particular virtual room on the display screen, such that the substantially photo-realistic visual depiction of the particular device, as well as the substantially photo-realistic visual depictions of the one or more boundaries of the portion of the structure and of the one or more furnishings located within the portion of the structure, reflect the changed state of the particular device.

17. The apparatus of claim 16 wherein the one or more devices include one or more light fixtures, the selection of the particular substantially photo-realistic visual depiction corresponds to a substantially photo-realistic visual depiction of a particular light fixture, and the control commands, when implemented, change the state of the particular light fixture by changing the particular light fixture's illumination.

18. The apparatus of claim 17 wherein the programmable multimedia controller is further configured to update the appearance of the particular virtual room to show a substantially photo-realistic depiction of the physical room with the particular light fixture illuminated.

19. The apparatus of claim 17 wherein the display screen and the interface are part of a touch-screen control unit coupled, either directly or indirectly, to the programmable multimedia controller.

20. An apparatus for controlling one or more devices within a physical room of a structure, comprising:
- means for issuing control commands which, when implemented, change the state of the one or more devices;
- means displaying a virtual room-based user interface, the virtual room-based user interface including one or more of virtual rooms, each virtual room including a substantially photo-realistic depiction of a portion of the structure, the substantially photo-realistic depiction of a portion of the structure including substantially photo-realistic visual depictions of one or more boundaries of the portion of the structure, one or more furnishings located within the portion of the structure, and one or more devices located within the portion of the structure;
- means for receiving a selection of a particular substantially photo-realistic visual depiction of a particular device within a particular virtual room;
- means for, in response to the selection of the particular substantially photo-realistic visual depiction of a device, issuing control commands which, when implemented, change the state of the particular device; and
- means for updating the appearance of the particular virtual room, such that the substantially photo-realistic visual depiction of the particular device, as well as the substantially photo-realistic visual depictions of the one or more boundaries of the portion of the structure and of the one or more furnishings located within the portion of the structure, reflect the changed state of the particular device.

* * * * *

UNITED STATES PATENT AND TRADEMARK OFFICE
CERTIFICATE OF CORRECTION

PATENT NO. : 8,296,669 B2
APPLICATION NO. : 12/792236
DATED : October 23, 2012
INVENTOR(S) : Robert P. Madonna et al.

It is certified that error appears in the above-identified patent and that said Letters Patent is hereby corrected as shown below:

In the Specification

In col. 12, line 57 should read:
plurality of buttons 910, 920, 930, 940 ~~coral~~ corresponding to In the Claims In col. 18, line 11, claim 7 should read:
The method of claim 1 wherein the one or more ~~of~~ virtual Signed and Sealed this
Second Day of July, 2013

Teresa Stanek Rea
*Acting Director of the United States Patent and Trademark Office*